US009247451B2

(12) United States Patent
Lee et al.

(10) Patent No.: US 9,247,451 B2
(45) Date of Patent: *Jan. 26, 2016

(54) RATE CONTROL METHOD AND APPARATUS FOR DATA PACKET TRANSMISSION

(71) Applicant: NEC CORPORATION, Tokyo (JP)

(72) Inventors: Jinsock Lee, Leatherhead (GB); Kojiro Hamabe, Yokohama (JP)

(73) Assignee: NEC CORPORATION, Tokyo (JP)

(*) Notice: Subject to any disclaimer, the term of this patent is extended or adjusted under 35 U.S.C. 154(b) by 64 days.

This patent is subject to a terminal disclaimer.

(21) Appl. No.: 13/950,315

(22) Filed: Jul. 25, 2013

(65) Prior Publication Data

US 2014/0029422 A1    Jan. 30, 2014

Related U.S. Application Data

(63) Continuation of application No. 10/557,551, filed as application No. PCT/JP2004/007137 on May 19, 2004, now Pat. No. 8,520,643.

(30) Foreign Application Priority Data

May 19, 2003  (GB) .................................. 0311496.4

(51) Int. Cl.
*H04L 12/26* (2006.01)
*H04W 28/02* (2009.01)
(Continued)

(52) U.S. Cl.
CPC ......... *H04W 28/0268* (2013.01); *H04L 1/0002* (2013.01); *H04L 1/0022* (2013.01); *H04L 1/0025* (2013.01); *H04L 1/0027* (2013.01); *H04L 1/0029* (2013.01); *H04W 28/22* (2013.01);

(Continued)

(58) Field of Classification Search
USPC .............. 370/229, 230, 230.1, 231, 232, 235, 370/236, 252, 328
See application file for complete search history.

(56) References Cited

U.S. PATENT DOCUMENTS 5,923,650 A   7/1999  Chen et al.
6,067,458 A   5/2000  Chen
(Continued)

FOREIGN PATENT DOCUMENTS

CN   1375949 A    10/2002
EP   0940930 A2    9/1999
(Continued)

OTHER PUBLICATIONS

Sumantra Chakravarty, "An algorithm for reverse traffic channel rate control for cdma2000 high rate packet data systems," IEEE Global Telecommunications Conference, Nov. 2001.

(Continued)

*Primary Examiner* — Kwang B Yao
*Assistant Examiner* — Nguyen Ngo
(74) *Attorney, Agent, or Firm* — Sughrue Mion, PLLC

(57) ABSTRACT

User equipment in a communication system including a base station includes: a receiver which receives, from the base station, a rate control command to up, down or keep a maximum transmission rate of the user equipment and receives, from the base station, absolute information by which the maximum transmission rate of the user equipment is determined, wherein an initial maximum transmission rate is set in the user equipment prior to receiving the rate control command or absolute information.

15 Claims, 16 Drawing Sheets

(51) Int. Cl.
*H04L 1/00* (2006.01)
*H04W 28/22* (2009.01)
*H04W 52/50* (2009.01)
*H04W 36/08* (2009.01)
*H04W 36/18* (2009.01)
*H04W 52/40* (2009.01)

(52) U.S. Cl.
CPC ............. *H04W 52/50* (2013.01); *H04L 1/0015* (2013.01); *H04W 36/08* (2013.01); *H04W 36/18* (2013.01); *H04W 52/40* (2013.01)

(56) References Cited

U.S. PATENT DOCUMENTS

| | | | |
|---|---|---|---|
| 6,181,686 B1 | 1/2001 | Hamalainen et al. | |
| 6,473,624 B1 | 10/2002 | Corbett et al. | |
| 7,061,888 B2 | 6/2006 | Sakoda | |
| 7,215,653 B2* | 5/2007 | Kim et al. | 370/329 |
| 7,411,923 B2* | 8/2008 | Attar et al. | 370/328 |
| 7,499,427 B2 | 3/2009 | Padovani et al. | |
| 8,150,407 B2* | 4/2012 | Ho et al. | 455/452.2 |
| 8,520,643 B2* | 8/2013 | Lee et al. | 370/335 |
| 2001/0017851 A1 | 8/2001 | Yamaguchi et al. | |
| 2002/0055367 A1 | 5/2002 | Hamabe et al. | |
| 2002/0151310 A1 | 10/2002 | Chung et al. | |
| 2003/0045237 A1* | 3/2003 | Gardner et al. | 455/63 |
| 2003/0063583 A1* | 4/2003 | Padovani et al. | 370/329 |
| 2003/0081692 A1 | 5/2003 | Kwan et al. | |
| 2003/0123406 A1 | 7/2003 | Yavuz et al. | |
| 2003/0219037 A1 | 11/2003 | Toskala et al. | |
| 2003/0231743 A1* | 12/2003 | Laskowsky et al. | 379/27.01 |
| 2004/0160914 A1 | 8/2004 | Sarkar | |
| 2004/0176042 A1* | 9/2004 | Lott et al. | 455/67.11 |
| 2004/0179525 A1* | 9/2004 | Balasubramanian et al. | 370/391 |
| 2004/0228349 A1* | 11/2004 | Vrzic et al. | 370/395.4 |
| 2004/0242256 A1* | 12/2004 | Xiao et al. | 455/522 |

FOREIGN PATENT DOCUMENTS

| | | |
|---|---|---|
| EP | 1168656 A2 | 1/2002 |
| EP | 1289179 A1 | 3/2003 |
| JP | 2002-094447 A | 3/2002 |
| JP | 2003-188855 A | 7/2003 |
| KP | 2002-0002381 A | 1/2002 |
| WO | 0045527 A2 | 8/2000 |
| WO | 02/01761 A1 | 1/2002 |
| WO | 02/09311 A2 | 1/2002 |
| WO | 03/001681 A2 | 1/2003 |
| WO | 03/003643 A1 | 1/2003 |

OTHER PUBLICATIONS

Technical Specification Group Radio Access Network, "3GPP TR 25.848 v4.0.0 Physical layer aspects of ultra high speed downlink packet access," Release 4, 2001.

Kojiro Hamabe, "Adjustment loop transmit power control during soft handover in CDMA cellular systems," IEEE Vehicular Technology Conference, 2000.

Troels Emil Lolding, et al., "High speed downling packet access: WCDMA Evolution," IEEE Vehicular Technology Society News, Feb. 2003.

Non-final Office Action issued Mar. 3, 2010 in parent U.S. Appl. No. 10/557,551.

Non-final Office Action issued Jul. 6, 2009 in parent U.S. Appl. No. 10/557,551.

Non-final Office Action issued Feb. 29, 2008 in parent U.S. Appl. No. 10/557,551.

Final Office Action issued Oct. 14, 2010 in parent U.S. Appl. No. 10/557,551.

Final Office Action issued Oct. 23, 2008 in parent U.S. Appl. No. 10/557,551.

Notice of Allowance issued Apr. 26, 2013 in parent U.S. Appl. No. 10/557,551.

* cited by examiner

RATE CONTROL METHOD AND APPARATUS FOR DATA PACKET TRANSMISSION

CROSS-REFERENCE TO RELATED APPLICATIONS

This application is a Continuation Application of U.S. application Ser. No. 10/557,551 filed Nov. 21, 2005, which is a National Stage of International Application No. PCT/JP2004/007137, filed on May 19, 2004, which claims priority from United Kingdom Patent Application No. 0311496.4, filed May 19, 2003, the contents of which are incorporated herein by reference in their entirety.

TECHNICAL FIELD

The present invention relates to data packet transmission rates, and more particularly, to a closed-loop rate control method and apparatus for data packet transmissions from a UE (user equipment) such as a mobile phone to a base station.

BACKGROUND ART

In cellular wireless systems, Wideband Code-Division Multiple-Access (W-CDMA, or the European equivalent UMTS (Universal Mobile Telecommunications System)) is the radio-access technology available worldwide providing high-speed wireless data packet service, i.e. wireless internet access and multimedia service, as well as conventional voice services.

To enable more-efficient downlink data packet transmission, a closed-loop based rate control called High-Speed Downlink Packet Access (HSDPA) was adopted as the next UMTS release. HSDPA is based on a closed-loop rate-control scheme in which the downlink transmission data rate is changed as rapidly as channel variation by controlling rate-matching and modulation parameters.

Similar to HSDPA, a closed-loop-based rate control can be used for uplink data transmission so that UE can change the uplink transmission rate to compensate for a short-term channel condition. As illustrated in FIG. 1, uplink transmission rate of an individual user's UE is controlled by a base station (node B) by exchanging feedback signals in both uplink (rate request) and downlink (rate control).

User equipment (UE) may request a higher data rate to node B if the current maximum data transmission rate $R^{ue}$ (UE threshold) cannot meet a required Quality of Service (QoS) of data packets in its internal buffer. Otherwise, the UE can request to keep or reduce $R^{ue}$ in order to allow other UEs in a same cell to transmit at a higher data rate.

Having requests from all UEs in the cell, node B controls the data transmission rate $R^{nb}$ of each individual UE based on additional internal information such as current uplink noise level. Initially, $R^{nb\prime}$ and $R^{ue\prime}$, the respective starting transmission rates of node B and the UE (mobile phone in the cell of node B), are set to be equal to each other. Subsequently, node B decides on a new transmission rate $R^{nb}$, i.e. ($R^{nb\prime}+d^{nb}$) to be used by the mobile phone, where $d^{nb}$ is a differentially-encoded control packet for changing the transmission rate of the mobile phone, and node B transmits $d^{nb}$ to the mobile phone. Assuming that the differentially-encoded control packet that the mobile phone detects in designated $d^{ue}$, then $d^{ue}$ is equal to $d^{nb}$ only if the transmission from node B to the UE has proceeded without error; if an error occurs during the transmission, then $d^{ue}$ will not equal $d^{nb}$.

There are two sources of feedback errors: (1) an uplink error in UE rate request, and (2) a downlink feedback error in the rate control command of node B. Both types of errors are inevitable because of factors such as limitations in transmission power, severe fading in wireless channels, etc.

Due to the fact that only node B has the authority to control the maximum data rate of the mobile phone, the uplink error is less of a problem than the downlink error. An uplink error incurs a slow adaptation of uplink rate control, while the latter breaks down the synchronization between $R^{nb}$ and $R^{ue}$. Loss of such synchronization causes the mobile phone, i.e. the UE, to transmit the data packet with excessively-high or excessively-low transmission power. With the former, there is a significant loss of manageability of uplink noise, while with the latter, the UE suffers low data throughput. These tradeoffs in data transmission rates for W-CDMA are illustrated in FIG. 2.

FIGS. 3 and 4 further illustrate the foregoing comments. FIG. 3 is a general schematic illustration of the closed-loop communication between node B and a UE, i.e. a base station and a mobile phone, respectively. The UE cannot transmit at a higher data rate than the maximum rate which is set by node B when the radio link between the two is established. If the UE requires for transmission a higher data rate than the established maximum data rate, the UE can request the higher data rate by sending a request in an uplink, i.e. the lower part of FIG. 3. If the UE does not require the higher data rate, for instance due to small packet queue size, it can send a request to node B to reduce the maximum transmission rate. Node B manages multiple UEs to share the same radio resources efficiently by controlling the maximum data rates for all users in node B's cell. Node B can accept or reject any UE request for data transmission rate increase, dependent on overall cell level conditions.

FIG. 4 illustrates a general timing diagram of a closed-loop-based rate control scheme between node B and a UE. In frame 'k', node B recognizes that the rate request on the uplink feedback channel from UE of which the current maximum rate is $R_k^{ue}$, and after elapse of node B processing time Tbp, node B transmits an increased maximum data transmission rate (denoted by 'U' for UP) to the UE on the downlink feedback channel. After elapse of UE processing time Tbp, the UE increases its maximum data transmission rate to the new higher value allowed by node B. Then the process repeats in frame k+1, frame k+2, etc. In order to reduce the rate update delay (e.g. Td<10 ms), the duration of the UE request and the node B control command are assumed to be small (e.g. 2 ms) and to be located near the beginning or end of the feedback channel frame (e.g. slots 1 to 3 or slots 12 to 14, respectively). In FIG. 4, the UE has received the U (UP), D (DOWN) and K (KEEP, i.e. stay the same) data-transmission-rate commands without any error in downlink transmission.

FIG. 5 illustrates an example of an error occurring in the closed-loop-based transmission. Such error results in a "random walk." The third rate command from node B, i.e. K (keep maximum data transmission rate the same), has been received at the UE as U (increase the maximum data transmission rate). All subsequent frames of communication between node B and the UE will have a mutual offset in their data transmission rates, i.e. random walking starts, even if no further error occurs between what node B transmits and what the UE considers it to be. Assuming even a low 1% error rate, the data rate control scheme breaks down after a few seconds of radio link connections due to random walking of the maximum data transmission rate between node B and the UE. An uplink (UL) error (from the UE to node B), may also result, but unlike the downlink (DL) error (from node B to the UE), the uplink error will only cause a delay and will not cause an error in the uplink data rate.

A number of matters must be considered in approaching a solution to the foregoing problem. Firstly, a solution that only reduces the probability of random walking is not suitable in the case of lengthy radio communications. Secondly, any solution should be radio wave spectrum efficient in order to guarantee more radio resources are allocated to data transmission per se rather than control of data transmission rate. Thirdly, a solution should avoid introducing a new physical channel which will impact on backward compatibility and design of new hardware, among other factors. Fourthly, it is desirable that there be no, or only minor, impact on the system's radio network controller (RNC), which controls essential communication between node B and the UE, since any involvement by the RNC necessitates additional expensive signalling between the RNC and node B, and also possibly between the RNC and the UE.

One conventional solution to the foregoing difficulty has involved explicit signalling of the maximum UE rate from node B to the UE. In this solution, node B explicitly transmits a new maximum data transmission rate $R^{nb}$ per se with each data packet rather than only transmitting a differentially-decoded $d^{nb}$ bit stream representing a change in the rate with each data packet. This solution, which is illustrated in FIG. 6, eliminates random walking. However, the spectral efficiency of this solution is lower than for the differentially-encoded bit stream due to the larger number of signalling bits per rate-control command. Assuming that the whole range of values of the maximum data transmission rate may assume any of 32 levels, 5 bits are required per rate-control command sent from node B to the UE. Since the 5 information bits equate to a higher number of encoded bits (e.g. 20 encoded bits), sending those 20 bits with each rate-control command will necessitate that a new physical channel be added if the control command is to be kept below 2 ms in length. The rate-control round-trip delay will increase if the encoded rate control bits are spread over a frame of, say, 10 ms. A major difficulty with this solution is that the overhead is much higher than that involved with transmitting only a differential value.

DISCLOSURE OF THE INVENTION

The subject invention seeks to reduce the error in signalling a maximum data transmission rate from a system node to user equipment (UE), while at the same time not requiring the amount of increased system overhead of the conventional system in attaining that objective.

A first aspect of the subject invention is a method for maintaining closed-loop control of a data communication rate between a UE and a base station, the method including the steps of:

initially transmitting to both the base station and the UE, for establishment of the closed-loop control, transmission rate periodic reset criteria (e.g. a predetermined common reset frequency) and a reference data transmission rate; and, periodically resetting the data transmission rate of the base station and the data transmission rate of the UE to the reference data transmission rate.

Preferably, the reference data transmission rate is equal to a predetermined common initial data transmission rate.

Preferably, the steps are performed by a radio network controller (e.g. by issuing instructions) in a system that comprises the controller, the base station and the UE.

A second general aspect, (which essentially encompasses the second specific and third and fourth aspects) provides a method for maintaining closed-loop control of a data communication rate between a UE and a base station, the method comprising transmitting both an absolute rate and a differential rate correction, wherein the absolute rate is transmitted in a first number of communication intervals and the differential rate correction is transmitted more frequently in a second, smaller number of communication intervals.

A complementary method to the second general aspect provides a method for maintaining closed-loop control of a data communication rate between a UE and a base station, the method comprising receiving differential rate corrections at first intervals and applying the differential rate corrections to obtain updated rates and receiving absolute rate information less frequently than the differential rate corrections and replacing the updates rates with the absolute rate when received.

In one embodiment (see the second specific aspect), the absolute rate is transmitted in parallel with the differential rate corrections. The absolute rate information may be subdivided into segments (e.g. one or more bits) and the segments may be transmitted serially over a number of intervals (e.g. frames).

In another embodiment (see the third aspect), bits of the absolute rate are interleaved with bits of the differential rate corrections.

In another embodiment (see the fourth aspect), the absolute rate is transmitted in response to a request.

The absolute rate may be transmitted by a different means to the differential rate, e.g. by using a different protocol layer or by using a different communication channel.

A second specific aspect of the subject invention provides a method for maintaining closed-loop control of a data communication rate between a UE and a base station, the method including, during each period of transmission of a defined set of data packets to the UE, the steps of:

storing in the base station, at the start of transmission of the defined set, an initial data transmission rate;

encoding in the base station, at the start of transmission of the defined set, the initial data transmission rate;

transmitting from the base station to the UE, in each data packet of the defined set, a respective differential correcting rate and a respective segment of the encoded initial data transmission rate;

storing in the UE, as each data packet is received, the respective differential correcting rate and the respective segment of the encoded initial data transmission rate;

calculating in the UE, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates;

decoding in the UE, after all segments of the decoded initial data transmission rate in the defined set of data packets have been received, those segments to form a decoded initial data transmission rate;

comparing in the UE the decoded initial data transmission rate with the updated transmission rate; and, if the transmission rates are not equal in the comparing step, correcting the data transmission rate of the UE by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

The second aspect of the subject invention includes a method performed by a base station for maintaining closed-loop control of a data communication rate between the base station and a UE, the method including, during each period of transmission of a defined set of data packets to the UE, the steps of:

storing, at the start of transmission of the defined set, an initial data transmission rate;

encoding, at the start of transmission of the defined set, the initial data transmission rate; and, transmitting to the UE, in each data packet of the defined set, a respective differential correcting rate and a respective segment of the encoded initial data transmission rate.

The second aspect of the subject invention also includes a method performed by a UE for maintaining closed-loop control of a data communication rate between the UE and a base station, the method including, during each period of transmission of a defined set of data packets to the UE, the steps of:

receiving from the base station, in each data packet of the defined set, a respective differential correcting rate and a respective segment of an encoded initial data transmission rate of the base station;

storing, as each data packet is received, the respective differential correcting rate and the respective segment of the encoded initial data transmission rates;

calculating, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates;

decoding, after all of the segments in the defined set of data packets have been received, those segments to form a decoded initial data transmission rate;

comparing the decoded initial data transmission rate with the updated transmission rate; and, if the transmission rates are not equal in the comparing step, correcting the data transmission rate of the UE by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

A third aspect of the subject invention is a method for maintaining closed-loop control of a data communication rate between a UE and a base station, the method including, during each period of transmission of a defined set of data packets to the UE, the steps of:

storing in the base station, at the start of transmission of the defined set, the initial data transmission rate;

encoding in the base station, at the start of transmission of the defined set, the initial data transmission rate;

transmitting, from the base station to the UE in every $n^{th}$ data packet of the defined set, a respective segment of the encoded initial data transmission rate, and in the remaining data packets of the defined set a respective differential correcting rate;

storing in the UE, as each data packet is received, the respective differential correcting rate and the respective segment of the encoded initial data transmission rate;

calculating in the UE, as each differential correcting rate is received, an updated data transmission rate, the updated rate being the sum of the previous updated rate and the respective received differential correcting rate, the initial data transmission rate being used as the initial updated rate;

decoding in the UE, after all segments of the encoded initial data transmission rate in the defined set of data packets have been received, those segments to form a decoded initial data transmission rate;

comparing in the UE the decoded initial data transmission rate with the updated transmission rate; and, if the transmission rates are not equal in the comparing step, correcting the data transmission rate of the UE by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

The third aspect of the subject invention also includes a method performed by a base station for maintaining closed-loop control of a data communication rate between the base station and a UE, the method including, during each period of transmission of a defined set of data packets to the UE, the steps of:

storing, at the start of transmission of the defined set, an initial data transmission rate;

encoding, at the start of transmission of the defined set, the initial data transmission rate; and, transmitting to the UE, in every $n^{th}$ data packet of the defined set, a respective segment of the encoded initial data transmission rate, and in the remaining data packets of the defined set a respective differential correcting rate.

The third aspect of the subject invention also includes a method performed by a UE for maintaining closed-loop control of a data communication rate between the UE and a base station, the method including, during each period of transmission of a defined set of data packets to the UE, the steps of:

receiving from the base station, in every $n^{th}$ data packet of the defined set, a respective segment of the encoded initial data transmission rate, and in the remaining data packets of the defined set a respective differential correcting rate;

storing, as each data packet is received, the respective differential correcting rate and the respective segment of the encoded initial data transmission rates;

calculating, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates;

decoding, after all segments of the encoded initial data transmission rate in the defined set of data packets have been received, those segments to form a decoded initial data transmission rate;

comparing the decoded initial data transmission rate with the updated transmission rate; and, if the transmission rates are not equal in the comparing step, correcting the data transmission rate of the UE by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

Every $n^{th}$ data packet of the defined set may be every second data packet of the defined set. Alternatively, every $n^{th}$ data packet of the defined set may be every third data packet of the defined set.

Preferably, each segment of the encoded initial data transmission rate is a single data bit.

A fourth aspect of the subject invention is a method for maintaining closed-loop control of a data communication rate between a UE and a base station, the method including, during each period of transmission of a defined set of data packets to the UE, the steps of:

transmitting from the base station to the UE, in each one or only some of the defined set of data packets, a differential correcting rate, each differential correcting rate representing a data-transmission-rate differential, if any, between the data transmission rate of the particular data packet and the date transmission rate of the transmitted data packet that last contained a differential correcting rate;

sensing when a difference occurs between the data transmission rate of the base station and the data transmission rate of the UE;

after such sensing, forwarding a request that the data transmission rate of the base station and the data transmission rate of the UE be reset to a common data transmission rate; and, transmitting to the base station and/or the UE, explicit signalling for resetting the data transmission rate of the base station and/or the data transmission rate of the UE such that the base station and the UE again have a common data transmission rate.

The sensing and forwarding steps may be both performed by the base station or alternatively by the UE, and the transmission of the explicit signalling is performed by a radio network controller in a system that includes the controller, the base station and the UE.

The fourth aspect of the subject invention includes a method performed by a base station for maintaining closed-loop control of a data communication rate between the base station and a UE, the method including, during each period of transmission of a defined set of data packets to the UE, the steps of:

transmitting to the UE, in each one or only some of the defined set of data packets, a differential correcting rate, each differential correcting rate representing a data-transmission-rate differential, if any, between the data transmission rate of the particular data packet and the data transmission rate of the transmitted data packet that last contained a differential correcting rate;

sensing when a difference occurs between the data transmission rate of the base station and the data transmission rate of the UE; and, after such sensing, forwarding a request to a radio network controller that the data transmission rate of the base station and the data transmission rate of the UE be reset to a common data transmission rate. And preferably, the method also includes the base station performing a step of:

receiving explicit signalling from the radio network controller for resetting the data transmission rate of the base station to a rate corresponding to the transmission rate of the UE.

The fourth aspect of the subject invention also includes a method performed by a UE for maintaining closed-loop control of a data communication rate between the UE and a base station, the method including, during each period of transmission of a defined set of data packets to the UE, the steps of:

receiving from the base station, in each one or only some of the defined set of data packets, a differential correcting rate, each differential correcting rate representing a data-transmission-rate differential, if any, between the data transmission rate of the particular data packet and the date transmission rate of the transmitted data packet that last contained a differential correcting rate;

sensing when a difference occurs between the data transmission rate of the base station and the data transmission rate of the UE; and, after such sensing, forwarding a request to a radio network controller that the data transmission rate of the base station and the data transmission rate of the UE be reset to a common data transmission rate. And preferably, the method further includes the UE performing a step of:

receiving explicit signalling from the radio network controller for resetting the data transmission rate of the UE to a rate corresponding to the transmission rate of the base station.

According to a fifth general aspect, the invention provides a method for maintaining closed-loop control of a data communication rate between a UE and a base station, the method comprising filtering received differential rate correction information to de-emphasize earlier differential rate correction information with respect to later differential rate correction information.

A fifth specific aspect of the subject invention is a method for maintaining closed-loop control of a data communication rate between a UE and a base station, the method including the steps of:

updating a data transmission rate of the base station each time a rate request signal is received from the UE, and updating the data transmission rate of the UE each time a rate control signal is received from the base station, each updating step being according to the following updating expression:

$$R(i+1)=R(i)+d(i)+(1-r)(R_{ref}-R(i))$$

where:

"i+1" is the current period;

"i" is the preceding period;

"R" is the data transmission rate in the particular period for the respective base station or UE;

"d" is a differential correcting rate that the respective base station or UE decides upon at each period using—information in the signal received from the other;

"$R_{ref}$" is a reference rate for data transmission, the reference rate being a value initially transmitted to both the base station and the UE; and, "r" is a convergence coefficient for data transmission, the coefficient being a value initially transmitted to both the base station and the UE.

Preferably, the transmission to the base station and to the UE of the reference rate $R_{ref}$ and the convergence coefficient r is by a radio network controller in a system that includes the controller, the base station and the UE.

The fifth aspect of the subject invention includes a method performed by a base station for maintaining closed-loop control of a data communication rate between the base station and a UE, the method including the step of:

updating a data transmission rate of the base station each time a rate request signal is received from the UE, the updating step being according to the following updating expression:

$$R^{nb}(i+1)=R^{nb}(i)+d^{nb}(i)+(1-r)(R_{ref}-R^{nb}(i))$$

where:

"i+1" is the current period;

"i" is the preceding period;

"$R^{nb}$" is the data transmission rate in the particular period updated by the base station;

"$d^{nb}$" is a differential correcting rate that the base station decides upon at each period using a rate request signal is received from the UE;

"$R_{ref}$" is a reference rate for data transmission, the reference rate being a value initially transmitted to both the base station and the UE; and, "r" is a convergence coefficient for data transmission, the coefficient being a value initially transmitted to both the base station and the UE.

The fifth aspect of the subject invention also includes a method performed by a UE for maintaining closed-loop control of a data communication rate between the base station and a UE, the method including the step of:

updating a data transmission rate of the UE each time a rate command signal is received from the base station, the updating step being according to the following updating expression:

$$R^{ue}(i+1)=R^{ue}(i)+d^{ue}(i)+(1-r)(R_{ref}-R^{ue}(i))$$

where:

"i+1" is the current period;

"i" is the preceding period;

"$R^{ue}$" is the data transmission rate in the particular period for the UE;

"$d^{ue}$" is a differential correcting rate detected by the UE;

"$R_{ref}$" is a reference rate for data transmission, the reference rate being a value initially transmitted to both the base station and the UE; and, "r" is a convergence coefficient for data transmission, the coefficient being a value initially transmitted to both the base station and the UE.

Preferably, each of the first to fifth aspects of the invention include additional steps for determining, for the base station and for the UE, a respective initial power offset value and a respective minimum repetition factor at establishment of a radio link between the base station and the UE, the additional steps including:

determining a target Signal/Interference Ratio ($tSIR_r$), where $tSIR_r$ is a SIR for a date transmission rate that satisfies a respective target feedback error rate;

determining a $tSIR_d$, which is the target SIR of a dedicated pilot signal;

determining, using the determined $tSIR_r$ and $tSIR_d$, a relationship between power offset values ($PO_r$) and repetition factors ($REP_r$), using the following formula:

$$PO_r = tSIR_r - tSIR_d - 10*\log_{10}(REP_r);$$

selecting the initial power offset value $PO_r(0)$ as that power offset value that corresponds to a minimum value ($REP_r(0)$) for the repetition factor ($REP_r$); and, transmitting, to the base station and UE at radio link establishment, the respective selected initial power offset value $PO_r(0)$ and the respective corresponding minimum repetition factor $REP_r(0)$.

A sixth aspect of the subject invention is a method for determining, for each of a base station and a UE, a respective initial power offset value and a respective minimum repetition factor at establishment of a radio link between the base station and the UE, the method including the steps of:

determining a target Signal/Interference Ratio ($tSIR_r$), where $tSIR_r$ is a SIR for a date transmission rate that satisfies a respective target feedback error rate;

determining a $tSIR_d$, which is a target SIR of a dedicated pilot signal;

determining, using the determined $tSIR_r$ and $tSIR_d$, a relationship between power offset values ($PO_r$) and repetition factors ($REP_r$), using the following formula:

$$PO_r = tSIR_r - tSIR_d - 10*\log_{10}(REP_r);$$

selecting the initial power offset value $PO_r(0)$ as that power offset value that corresponds to a minimum value ($REP_r(0)$) for the repetition factor ($REP_r$); and, transmitting, to the base station and the UE at radio link establishment, the respective selected initial power offset value $PO_r(0)$ and the respective corresponding minimum repetition factor $REP_r(0)$.

Preferably, the target feedback error rate in the foregoing method is set distinctly for each rate control command as the target error rate of Rate Control, and is lower than that of Rate Request.

Preferably, the steps in the sixth aspect of the invention are performed by a radio network controller in a system that includes the controller, the base station and the UE.

The subject invention also includes a modification of any of the foregoing methods when the UE is involved in a soft handover from the base station to a second base station. The modification of the methods discussed above involves the UE performing the following steps:

detecting $R^{ue1}$ and $R^{ue2}$ transmitting rates for the base station and the second base station, respectively, based on $R^{nb1}$ and $R^{nb2}$ transmitting rates transmitted to the UE by the base station and the second base station, respectively;

calculating, based on $R^{ue1}$ and $R^{ue2}$, a composite $R^{ue}$ transmitting rate; and, transmitting $R^{ue}$ to both the base station and the second base station, so that the base station and the second base station can each use $R^{ue}$ to create a respective new $R^{nb1}$ and $R^{nb2}$ transmission rate to be transmitted to the UE.

The first aspect of the subject invention also includes an apparatus for maintaining closed-loop control of a data communication rate between a UE and a base station, the apparatus including:

means for initially transmitting to both the base station and the UE, for establishment of the closed-loop control, a predetermined common reset frequency and a predetermined common initial data transmission rate; and, means for periodically resetting the data transmission rate of the base station and the data transmission rate of the UE to a reference data transmission rate.

Preferably, the reference data transmission rate is equal to the predetermined common initial data transmission rate.

Preferably, the apparatus is a radio network controller in a system which includes the base station and the UE.

The second aspect of the subject invention also includes an apparatus for maintaining closed-loop control of a data communication rate between a UE and a base station, the apparatus including:

means for storing, at the start of transmission of a defined set of data packets, an initial data transmission rate;

means for encoding, at the start of transmission of the defined set, the initial data transmission rate;

means for transmitting, in each data packet of the defined set, a respective differential correcting rate and a respective segment of the encoded initial data transmission rate;

means for storing, as each data packet is received, the respective differential correcting rate and the respective segment of the encoded initial data transmission rate;

means for calculating, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates;

means for decoding, after all segments of the decoded initial data transmission rate in the defined set of data packets have been received, those segments to form a decoded initial data transmission rate; and, means for:
comparing the decoded initial data transmission rate with the updated transmission rate; and,
if the transmission rates are not equal in the comparing step, correcting the data transmission rate by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

The second aspect of the subject invention further includes an apparatus for maintaining closed-loop control of a data communication rate between a base station and a UE, the apparatus including:

means for storing, at the start of transmission of a defined set of data packets, an initial data transmission rate;
means for encoding, at the start of transmission of the defined set, the initial data transmission rate; and,
means for transmitting, in each data packet of the defined set, a respective differential correcting rate and a respective segment of the encoded initial data transmission rate.

Preferably, the apparatus is a base station of a system comprising the base station and the UE.

The second aspect of the subject invention also further includes an apparatus for maintaining closed-loop control of a data communication rate between a UE and a base station, the apparatus including:

means for receiving, in each data packet of a defined set, a respective differential correcting rate and a respective segment of a encoded initial data transmission rate;
means for storing, as each data packet is received, the respective differential correcting rate and the respective segment of the encoded initial data transmission rates;
means for calculating, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates;
means for decoding, after all of the segments in the defined set of data packets have been received, those segments to form a decoded initial data transmission rate;
means for:
comparing the decoded initial data transmission rate with the updated transmission rate; and,
if the transmission rates are not equal in the comparing step, correcting the data transmission rate by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

Preferably, the apparatus is a UE of a system comprising the UE and a base station.

The third aspect of the subject invention also includes an apparatus for maintaining closed-loop control of a data communication rate between a UE and a base station, the apparatus including:

means for storing, at the start of transmission of a defined set of data packets, an initial data transmission rate;

means for encoding, at the start of transmission of the defined set, the initial data transmission rate;
means for transmitting, in every $n^{th}$ data packet of the defined set, a respective segment of the encoded initial data transmission rate, and in the remaining data packets of the defined set a respective differential correcting rate;
means for storing, as each data packet is received, the respective differential correcting rate and the respective segment of the encoded initial data transmission rate;
means for calculating, as each differential correcting rate is received. an updated data transmission rate, the updated rate being the sum of the previous updated rate and the respective received differential correcting rate, the initial data transmission rate being used as the initial updated rate;
means for decoding, after all segments of the encoded initial data transmission rate in the defined set of data packets have been received, those segments to form a decoded initial data transmission rate; and,
means for:
comparing the decoded initial data transmission rate with the updated transmission rate; and,
if the transmission rates are not equal in the comparing step, correcting the data transmission rate by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

The third aspect of the subject invention also further includes an apparatus for maintaining closed-loop control of a data communication rate between a base station and a UE, the apparatus including:

means for storing, at the start of transmission of a defined set of data packets, an initial data transmission rate;
means for encoding, at the start of transmission of the defined set, the initial data transmission rate; and,
means for transmitting, in every $n^{th}$ data packet of the defined set, a respective segment of the encoded initial data transmission rate, and in the remaining data packets of the defined set a respective differential correcting rate.

Preferably, the apparatus is a base station of a system including the base station and a UE.

The third aspect of the subject invention also further includes an apparatus for maintaining closed-loop control of a data communication rate between a UE and a base station, the apparatus including:

means for receiving, in every $n^{th}$ data packet of the defined set, a respective segment of an encoded initial data transmission rate, and in the remaining data packets of the defined set a respective differential correcting rate;
means for storing, as each data packet is received, the respective differential correcting rate and the respective segment of the encoded initial data transmission rates;
means for calculating, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates;
means for decoding, after all segments of the encoded initial data transmission rate in the defined set of data packets have been received, those segments to form a decoded initial data transmission rate; and, means for:
    comparing the decoded initial data transmission rate with the updated transmission rate; and,
    if the transmission rates are not equal in the comparing step, correcting the data transmission rate by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

Preferably, the apparatus is a UE of a system including the UE and a base station.

Every $n^{th}$ data packet of the defined set may be every second data packet of the defined set. Alternatively, every $n^{th}$ data packet of the defined set is every third data packet of the defined set.

Each segment of the encoded initial data transmission rate may be a single data bit.

The fourth aspect of the subject invention also includes an apparatus for maintaining closed-loop control of a data communication rate between a UE and a base station, the apparatus including:
    (a) means for transmitting from the base station to the UE, in each one or only some of a defined set of data packets, a differential correcting rate, each differential correcting rate representing a data-transmission-rate differential, if any, between the data transmission rate of the particular data packet and the date transmission rate of the transmitted data packet that last contained a differential correcting rate;
    (b) means for sensing when a difference occurs between the data transmission rate of the base station and the data transmission rate of the UE, and for forwarding, after such sensing, a request that the data transmission rate of the base station and the data transmission rate of the UE be reset to a common data transmission rate; and,
    (c) means for transmitting to the base station and/or the UE, explicit signalling for resetting the data transmission rate of the base station and/or the data transmission rate of the UE such that the base station and the UE again have a common data transmission rate.

The apparatus may be a system including the base station, the UE and a radio network controller, and wherein the transmitting means (a) is included in the base station, the sensing/forwarding means (b) is included in the base station, and the transmitting means (c) is included in the radio network controller. Alternatively, the apparatus may be a system including the base station, the UE and a radio network controller, and wherein the transmitting means (a) is included in the base station, the sensing/forwarding means (b) is included in the UE, and the transmitting means (c) is included in the radio network controller.

The fourth aspect of the subject invention also further includes an apparatus for maintaining closed-loop control of a data communication rate between a base station and a UE, the apparatus being the base station and including:
    means for transmitting to the UE, in each one or only some of a defined set of data packets, a differential correcting rate, each differential correcting rate representing a data-transmission-rate differential, if any, between the data transmission rate of the particular data packet and the date transmission rate of the transmitted data packet that last contained a differential correcting rate; and,
    means for sensing when a difference occurs between the data transmission rate of the base station and the data transmission rate of the UE, and after such sensing, forwarding a request to a radio network controller that the data transmission rate of the base station and the data transmission rate of the UE be reset to a common data transmission rate.

Preferably, the immediately-preceding apparatus further includes means for receiving explicit signalling from the radio network controller for resetting the data transmission rate of the base station to a rate corresponding to the transmission rate of the UE.

The fourth aspect of the subject invention also further includes an apparatus for maintaining closed-loop control of a data communication rate between a UE and a base station, the apparatus being the UE and including:
    means for receiving from the base station, in each one or only some of a defined set of data packets, a differential correcting rate, each differential correcting rate representing a data-transmission-rate differential, if any, between the data transmission rate of the particular data packet and the date transmission rate of the transmitted data packet that last contained a differential correcting rate; and,
    means for sensing when a difference occurs between the data transmission rate of the base station and the data transmission rate of the UE, and after such sensing, forwarding a request to a radio network controller that the data transmission rate of the base station and the data transmission rate of the UE be reset to a common data transmission rate.

Preferably, the immediately-preceding apparatus further includes means for receiving explicit signalling from the radio network controller for resetting the data transmission rate of the UE to a rate corresponding to the transmission rate of the base station.

The fifth aspect of the subject invention also further includes an apparatus for maintaining closed-loop control of a data communication rate between a UE and a base station, the apparatus including:
    first means for updating a data transmission rate of the base station each time a rate request signal is received from the UE, and second means for updating the data transmission rate of the UE each time a rate control signal is received from the base station, each updating being according to the following updating expression:

$$R(i+1)=R(i)+d(i)+(1-r)(R_{ref}-R(i))$$

where:
    "i+1" is a current period;
    "i" is a preceding period;
    "R" is the data transmission rate in a particular period for the respective base station or UE;
    "d" is a differential correcting rate that the respective base station or UE decides upon in each period using information in a signal received from the other;
    "$R_{ref}$" is a reference rate for data transmission, the reference rate being a value received initially by both the base station and the UE; and,
    "r" is a convergence coefficient for data transmission, the coefficient being a value received initially by both the base station and the UE.

Preferably, the apparatus is a system that includes the base station, the UE and a radio network controller, wherein the first updating means is included in the base station and the second updating means is included in the UE, and wherein the transmission to the base station and to the UE of the reference rate $R_{ref}$ and the convergence coefficient r is by the radio network controller of the system.

The fifth aspect of the subject invention also further includes an apparatus for maintaining closed-loop control of a data communication rate between a base station and a UE, the apparatus including:

means for updating a data transmission rate each time a rate request signal is received, the updating being according to the following updating expression:

$$R^{nb}(i+1)=R^{nb}(i)+d^{nb}(i)+(1-r)(R_{ref}-R^{nb}(i))$$

where:
"i+1" is a current period;
"i" is a preceding period;
"$R^{nb}$" is the data transmission rate in a particular period updated by the base station;
"$d^{nb}$" is a differential correcting rate decided upon in each period using a rate request signal received from the UE;
"$R_{ref}$" is a reference rate for data transmission, the reference rate being a value received initially; and,
"r" is a convergence coefficient for data transmission, the coefficient being a value received initially.

Preferably, the apparatus is a base station of a system including the base station, the UE and a radio network controller, and wherein the reference rate $R_{ref}$ and the convergence coefficient r are received initially from the radio network controller of the system.

The fifth aspect of the subject invention also still further includes an apparatus for maintaining closed-loop control of a data communication rate between a base station and a UE, the apparatus including:
means for updating a data transmission rate each time a rate command signal is received, each updating being according to the following updating expression:

$$R^{ue}(i+1)=R^{ue}(i)+d^{ue}(i)+(1-r)(R_{ref}-R^{ue}(i))$$

where:
"i+1" is a current period;
"i" is a preceding period;
"$R^{ue}$" is the data transmission rate in a particular period updated by the UE;
"$d^{ue}$" is a differential correcting rate detected by the UE;
"$R_{ref}$" is a reference rate for data transmission, the reference rate being a value received initially; and,
"r" is a convergence coefficient for data transmission, the coefficient being a value received initially.

Preferably, the apparatus is a UE of a system including the base station, the UE and a radio network controller, and wherein the reference rate $R_{ref}$ and the convergence coefficient r are received initially from the radio network controller of the system.

Preferably, the apparatus in each of the first to fifth aspects of the invention also includes means for determining, for the base station and for the UE, a respective initial power offset value and a respective minimum repetition factor at establishment of a radio link between the base station and the UE, the determining means including:
means for determining a target Signal/Interference Ratio ($tSIR_r$), where $tSIR_r$ is a SIR for a date transmission rate that satisfies a respective target feedback error rate;
means for determining a $tSIR_d$, which is the target SIR of a dedicated pilot signal;
means for determining, using the determined $tSIR_r$ and $tSIR_d$, a relationship between power offset values ($PO_r$) and repetition factors ($REP_r$), using the following formula:

$$PO_r=tSIR_r-tSIR_d-10*\log_{10}(REP_r);$$

means for selecting the initial power offset value $PO_r(0)$ as that power offset value that corresponds to a minimum value ($REP_r(0)$) for the repetition factor ($REP_r$); and,
means for transmitting, to the base station and the UE at radio link establishment, the respective selected initial power offset value $PO_r(0)$ and the respective corresponding minimum repetition factor $REP_r(0)$.

The sixth aspect of the subject invention also includes an apparatus for determining, for each of a base station and a UE, a respective initial power offset value and a respective minimum repetition factor at establishment of a radio link between the base station and the UE, the apparatus including:
means for determining a target Signal/Interference Ratio ($tSIR_r$), where $tSIR_r$ is a SIR for a date transmission rate that satisfies a respective target feedback error rate;
means for determining a $tSIR_d$, which is a target SIR of a dedicated pilot signal;
means for determining, using the determined $tSIR_r$ and $tSIR_d$, a relationship between power offset values ($PO_r$) and repetition factors ($REP_r$), using the following formula:

$$PO_r=tSIR_r-tSIR_d-10*\log_{10}(REP_r);$$

means for selecting the initial power offset value $PO_r(0)$ as that power offset value that corresponds to a minimum value ($REP_r(0)$) for the repetition factor ($REP_r$); and,
means for transmitting, to the base station and the UE at radio link establishment, the respective selected initial power offset value $PO_r(0)$ and the respective corresponding minimum repetition factor $REP_r(0)$.

In the apparatus of the sixth aspect of the subject invention, the target feedback error rate is set distinctly for each rate control command as the target Rate Control, and is lower than that of Rate Request. The apparatus may include a radio network controller in a system that comprises the controller, the base station and the UE.

In the apparatus of any of the preceding aspects of the subject invention, the UE may further include:
means for detecting, after communication has been established with the base station and during a transfer of the UE from the base station to a second base station, transmitting rates $R^{ue1}$ and $R^{ue2}$ for the base station and the second base station, respectively, based on $R^{nb1}$ and $R^{nb2}$ transmitting rates transmitted to the UE by the base station and the second base station, respectively;
means for calculating, based on $R^{ue1}$ and $R^{ue2}$, a composite $R^{ue}$ transmitting rate; and,
means for transmitting $R^{ue}$ to both the base station and the second base station, so that the base station and the second base station can each use $R^{ue}$ to create a respective new $R^{nb1}$ and $R^{nb2}$ transmission rate to be transmitted to the UE.

The subject invention also includes a storage medium carrying a computer program for performing any of the previously-described methods. Method aspects and their preferred features may be applied to apparatus aspects and vice versa and all aspects may be provided as computer programs or computer program products.

BRIEF DESCRIPTION OF THE DRAWINGS

Preferred features of the present invention will now be described, by way of example only, with reference to the accompanying drawings, in which.

BEST MODE FOR CARRYING OUT THE INVENTION

The key concept in a first solution to the problem mentioned above is periodic reset-based synchronization. This involves the radio network controller (RNC) signalling a reset frequency Q and a reference data transmission rate $R_{ref}$ to both node B and the UE at radio-link establishment, and then after closed-loop rate control is initiated, node B and the UE periodically reset $R^{nb}$ and $R^{ue}$, respectively, to $R_{ref}$. The time reference of periodic reset is the Connection Frame Number (CFN) which is a common reference time between node B and the UE during radio link connection.

The benefit of this scheme is its simplicity. Also, this method is useful when the number of available uplink rates is small, although the periodic resetting will interrupt the fast closed-loop rate control. If the available uplink rate is large, significant jitter will cause severe interruption of closed-loop rate control.

A second solution to the problem mentioned above involves three "simultaneous signalling" schemes, each of which will next be described.

The key concept in the first simultaneous signalling scheme is to have node B inform the UE of the maximum data transmission rate that it wishes the UE to use after L frames, by sending to UE in each of the L frames: (1) a respective portion of the maximum data transmission rate that exists at the start of the L frames, and (2) a differential correcting rate for the particular one of the L frames. The differential correcting rate for a current frame is the difference that has occurred between the data transmission rates at node B between frames; that difference may be due to noise and/or a rate request change from the UE. The UE uses the transmitted portions of the transmission rate that existed at node B at the start of the L frames, and after the L frames are received, reconstructs that transmission rate, i.e. the rate at node B at the start of the L frames. Meanwhile, the UE has been maintaining a running total of the differential correcting rates transmitted over the L frames, the total after the L frames being an aggregated correcting rate. Meanwhile, the UE has been updating its data transmission rate $R^{ue}$ by adding the differential correcting rate after each frame to the value from the previous frame, an updated transmission rate being thereby determined after each frame. The UE then compares the reconstructed transmission rate to the updated transmission rate at the end of the L frames. If they are equal, the UE does not need to replace the updated transmission rate; if they are not equal, the UE substitutes a new transmission rate for the updated transmission rate. The new transmission rate is the total of the reconstructed transmission rate and the aggregated correcting rate.

Figure 1:
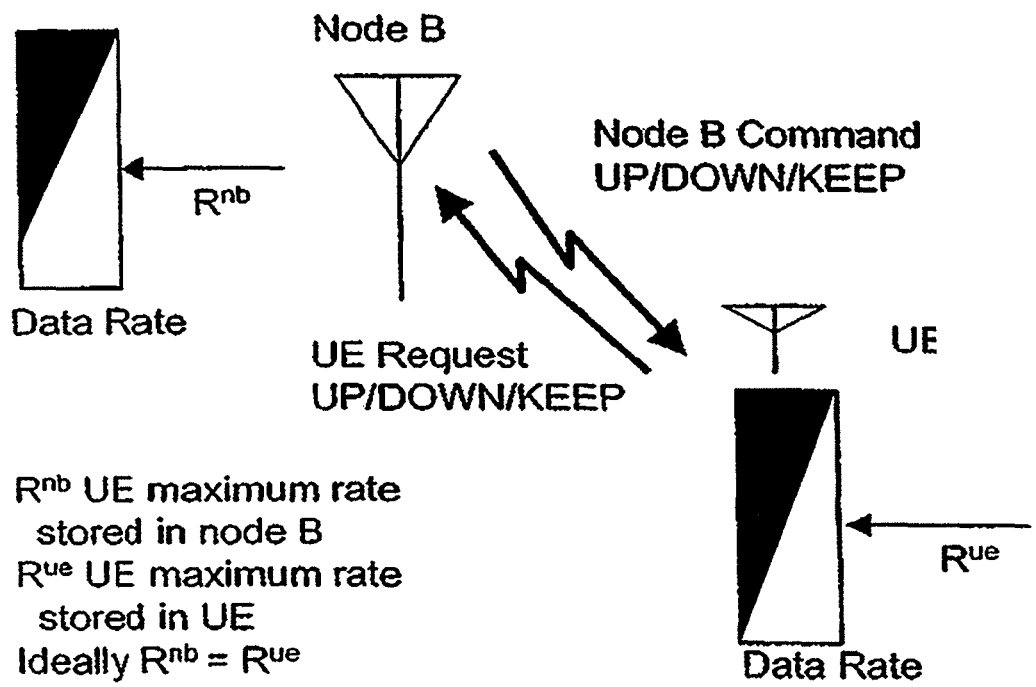
FIG. 1 illustrates the communication between a base system (node B) and a mobile phone (UE), the uplink transmission rate of the UE being controlled by node B.
Figure 2:
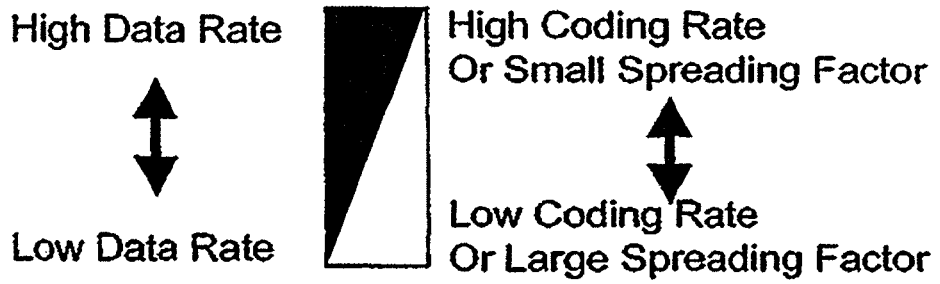
FIG. 2 illustrates the trade-offs involved in data transmission rates in W-CDMA.
Figure 3:
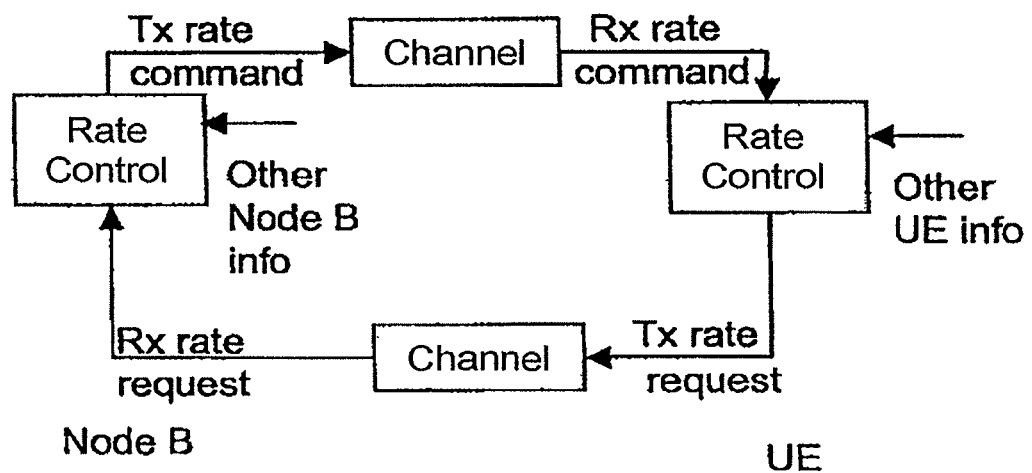
FIG. 3 is a general schematic illustration of the closed-loop communication that occurs between the UE and node B.
Figure 4:
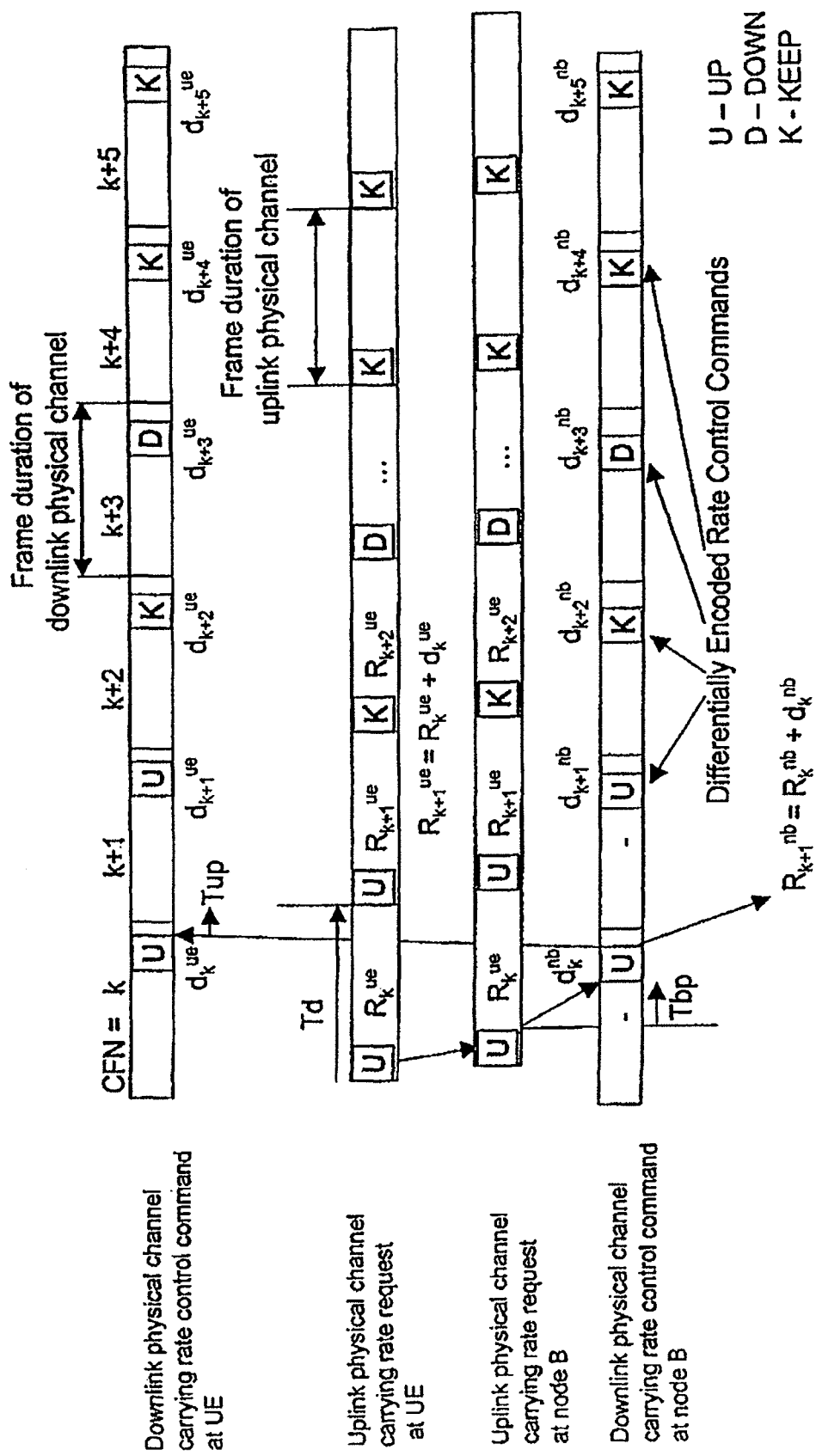
FIG. 4 illustrates a general timing diagram of a closed-loop-based rate control arrangement between the UE and node B.
Figure 5:
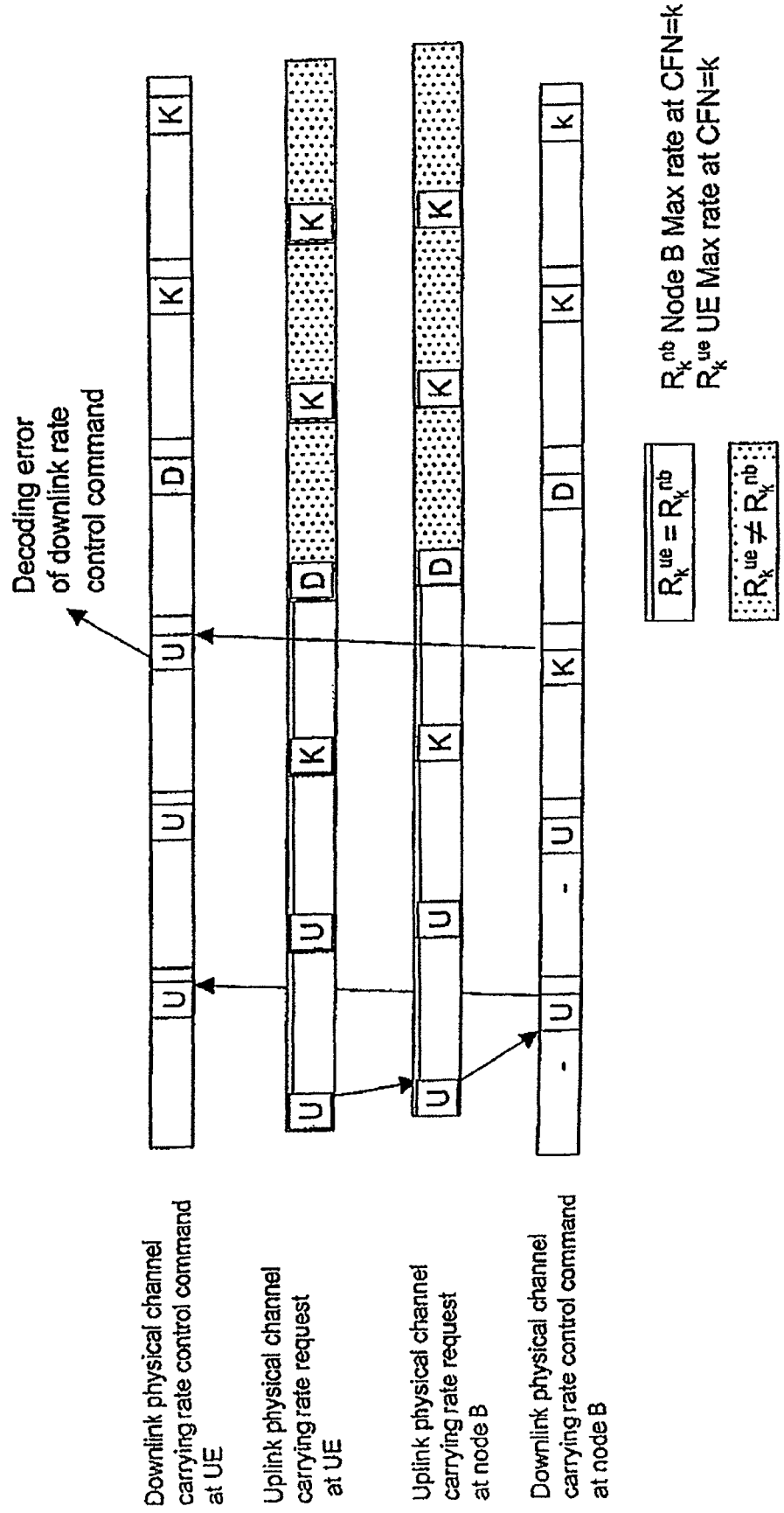
FIG. 5 is similar to the timing diagram illustrated in FIG. 4, but illustrates the events occurring after the UE decides on an incorrect value for a rate control command sent from node B.
Figure 6:
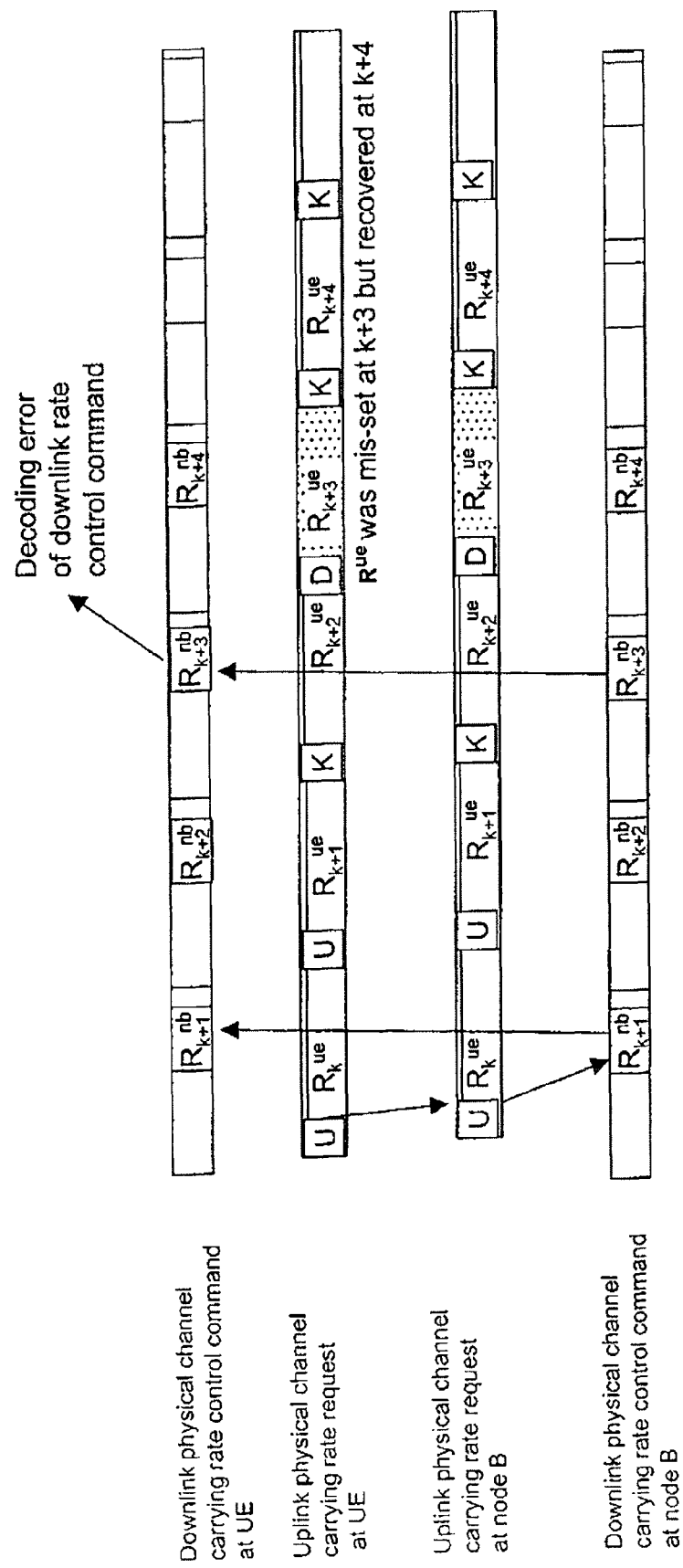
FIG. 6 illustrates the control timing involved with a conventional solution to correcting the error illustrated in FIG. 5.
Figure 7:
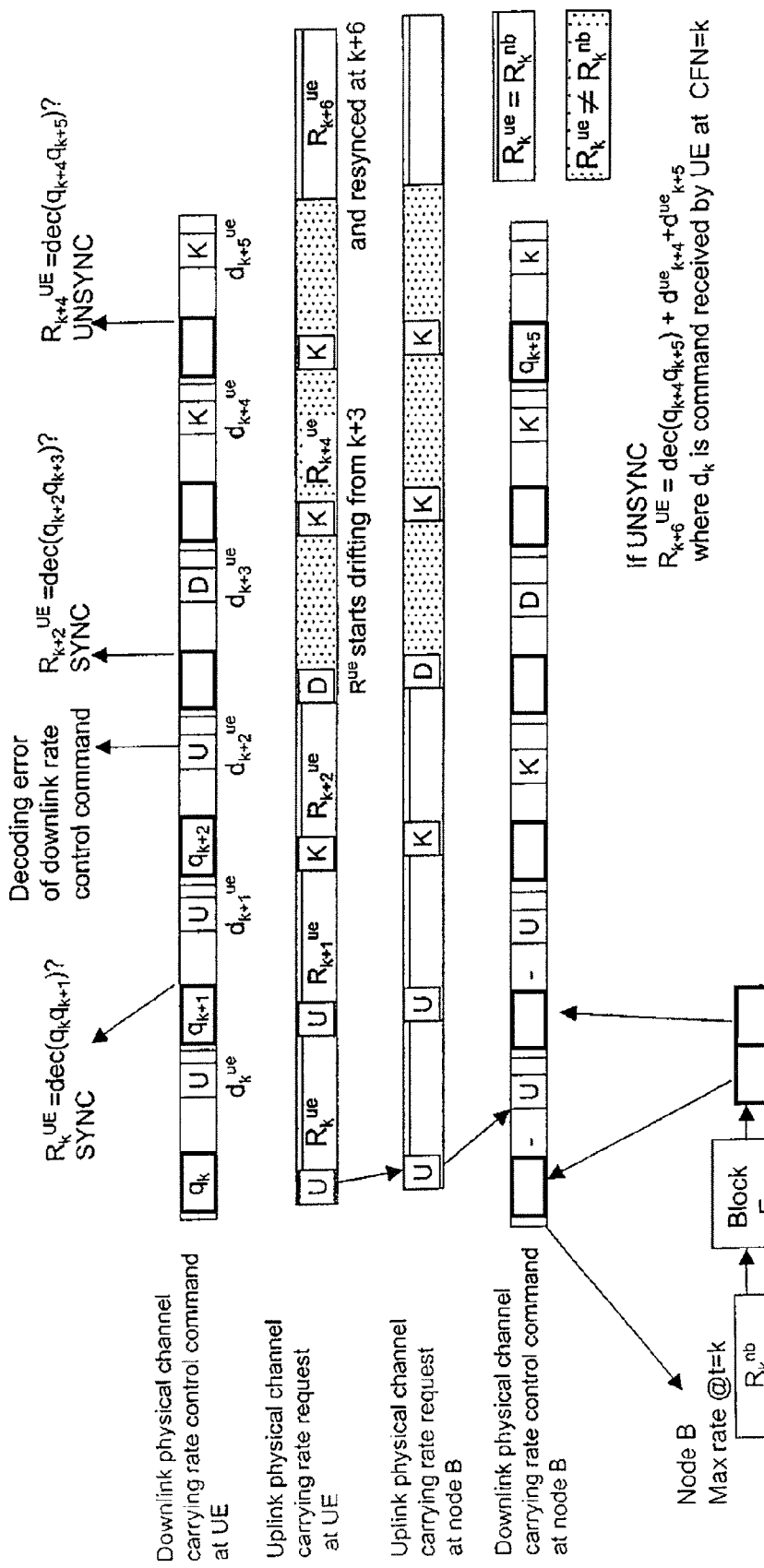
FIG. 7 illustrates the control timing involved with a first type of simultaneous signalling scheme of the subject invention.
Figure 8A:
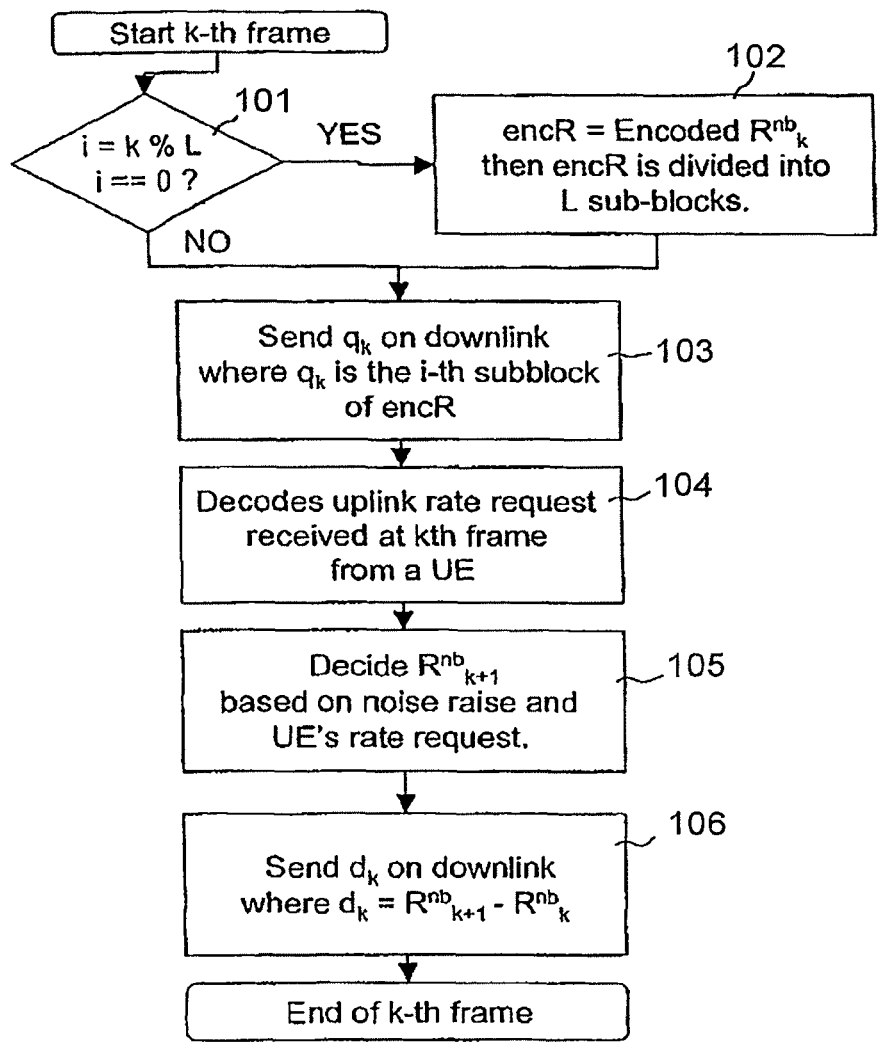
FIG. 8A is a flowchart illustrating the procedure in node B for explaining the control timing of FIG. 7.
Figure 8B:
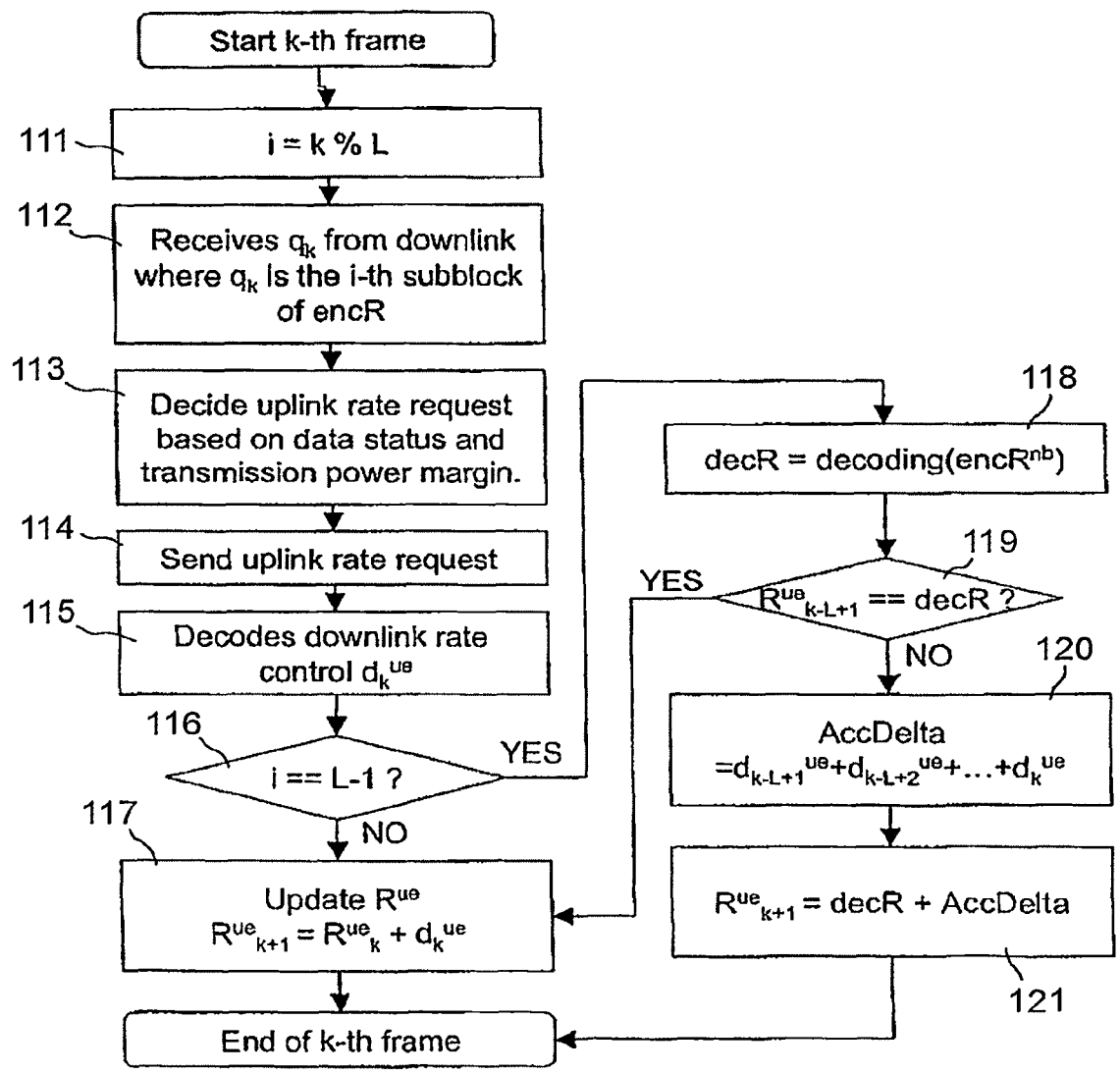
FIG. 8B is a flowchart illustrating the procedure in UE for explaining the control timing of FIG. 7.

FIGS. 7, 8A and 8B illustrate this arrangement. FIGS. 8A and 8B illustrate, for frame k, the node B procedure and the UE procedure, respectively. As shown, the differential correcting rate ($d_k$) sent in frame k in the node B procedure is equal to the difference that has occurred between frames in the uplink transmission rate at node B (due to raised noise and any rate request change from the UE). A synchronization occurs at the UE after transmission of the "k" frames. In FIG. 8B, "Update $R^{ue}$" is the updated uplink transmission rate in the UE after frame k (updating occurs after each frame), "decR" is the reconstructed transmission rate in the UE after frame k (only performed at the end of k frames), and "AccDelta" is the aggregated correcting rate after frame k (if needed, only calculated at the end of k frames). In FIG. 7, the drifting of $R^{ue}$ starts in frame k+3 (due to the "K" sent by node B in frame k+2 being received by the UE as a "U"), and resynchronization is only attained in frame k+6.

In node B, residue i (=k % L) is first calculated and compared with zero at box 101 in FIG. 8A. Here, "k % L" represents a residue of division of k by L. If i=0, then encR is set to encoded $R^{nb}_k$, and encR is divided to into L sub-blocks at box 102.

Next, $q^k$ is sent on the downlink at box 103 where $q^k$ is the $i^{th}$ sub-block of encR. The uplink rate request which is received at $k^{th}$ frame from a UE is decoded at box 104, and $R^{nb}_{k+1}$ is determined based on the noise raise and the UE's rate request at box 105. Finally, $d_k$, which is calculated by $R^{nb}_{k+1} - R^{nb}_k$, is sent on the downlink at box 107.

In the UE, the residue i is first calculated at box 111 in FIG. 8B, $q_k$ is received from the downlink at box 112. The uplink rate request is determined based on the data status and the transmission power margin at box 113 and is sent at box 114, and the downlink rate control $d_k^{ue}$ is decoded at box 115. Next, i is compared with L−1 at box 116. IF i≠L−1, then $R^{ue}$ is updated by $R^{ue}_{k+1} = R^{ue}_k + d_k^{ue}$ at box 117, and the procedure is completed. If i=L−1 at box 116, the decR is set to decoding (enc$R^{nb}$) at box 118, and $R^{ue}_{k-L+1}$ is compared with decR at box 119. If $R^{ue}_{k-L+1}$=decR then the control jumps to box 117 and otherwise the control transfers to box 119. In box 119, AccDelta is set to $d^{ue}_{k-L+1} + d^{ue}_{k-L+2} + \ldots + d^{ue}_k$ at box 120, and $R^{ue}_{k+1}$ is updated by decR+AccDelta at box 121 to complete the procedure.

This is a spectrally-efficient method compared to the conventional solution, transmitting a smaller redundancy bit (e.g.

as little as 1 bit per frame when L is equal to the total number of encoded bits in the reconstructed transmission rate). Its elimination of threshold drift is slower than that in the conventional system, i.e. the synchronization is checked only after each L frames.

Figure 9A:
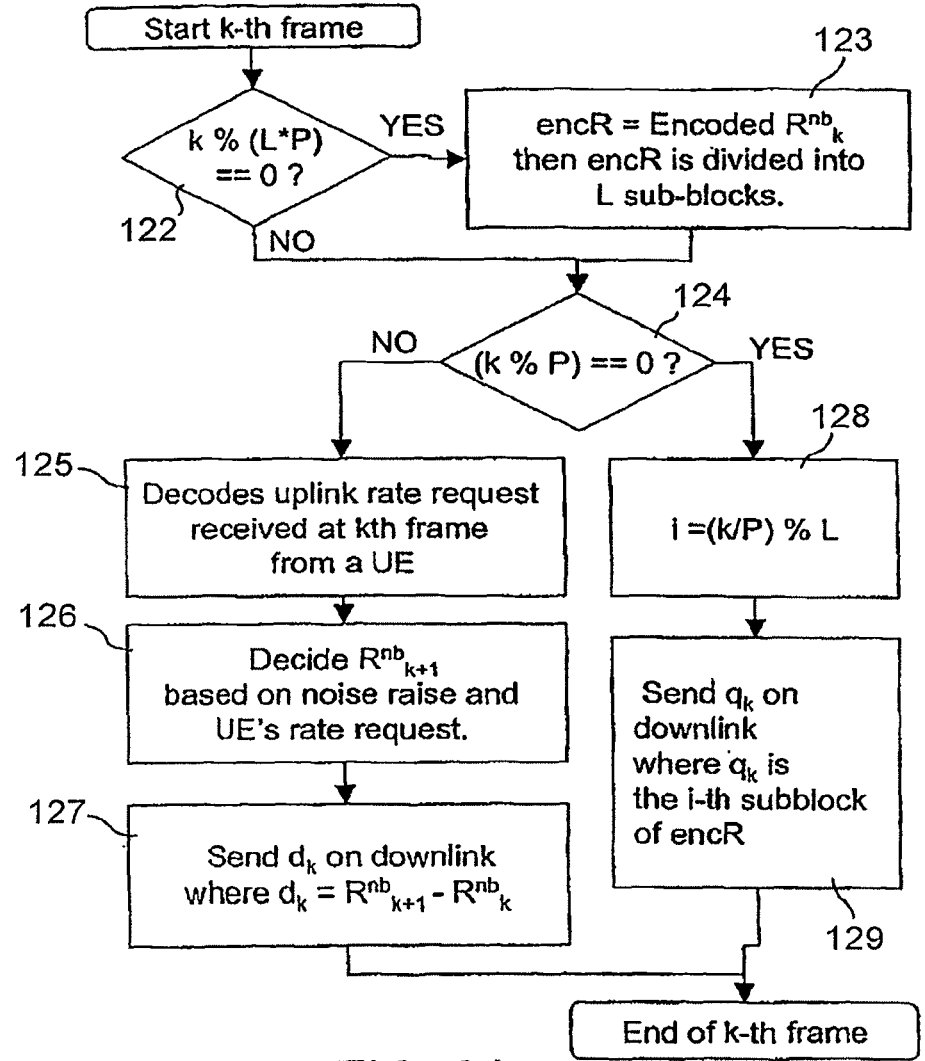
FIG. 9A is a flowchart illustrating the procedure in node B for explaining the control timing of a second type of simultaneous signalling scheme of the subject invention.
Figure 9B:
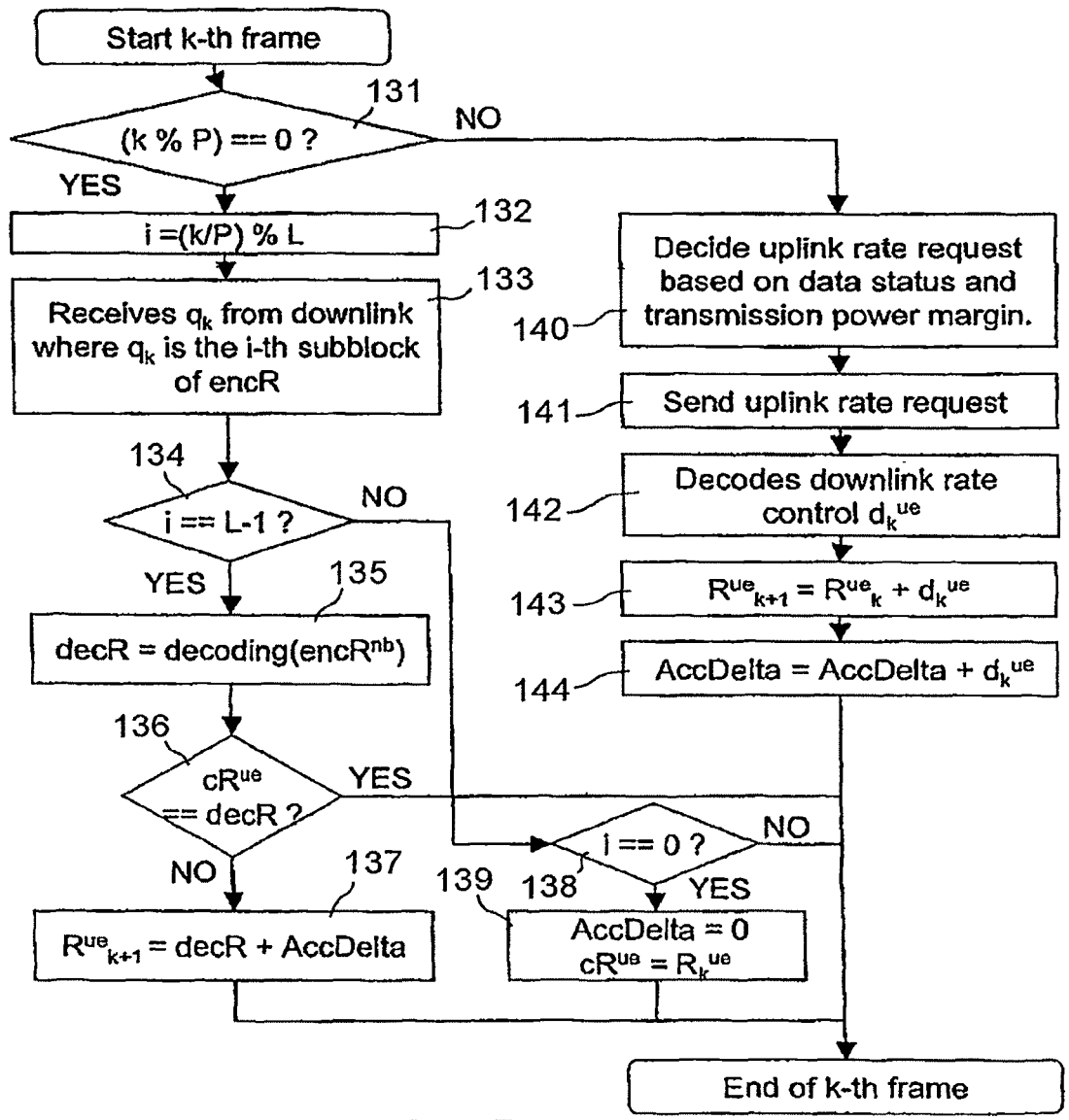
FIG. 9B is a flowchart illustrating the procedure in UE for explaining the control timing of a second type of simultaneous signalling scheme of the subject invention.
Figure 10:
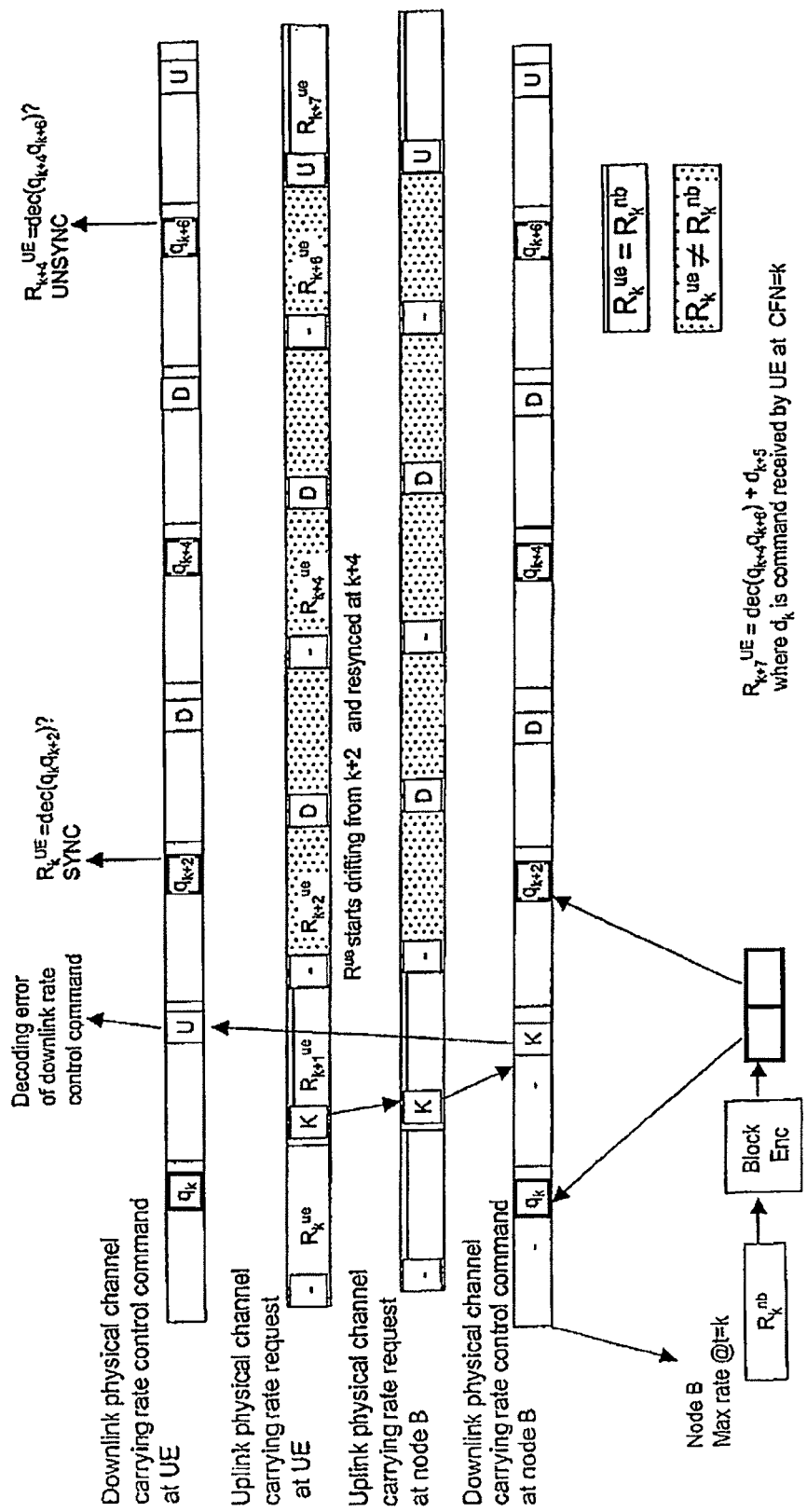
FIG. 10 illustrates the control timing involved with the second type of simultaneous signalling scheme.

The key concept in the second simultaneous signalling scheme is similar to that in the first simultaneous signalling scheme, but differs in that 2L frames are used instead of L frames, and each portion of the maximum data transmission rate existing at the start of the 2L frames is transmitted to the UE in every second frame, with each differential correcting rate being transmitted in the intervening frames. FIGS. 9A, 9B and 10 illustrate this arrangement. FIGS. 9A and 9B illustrate the node B procedure and the UE procedure, respectively. The UE only forwards any rate request change every second frame in this scheme, since a response, i.e. a control command from node B in the form of a differential correcting rate $d^{nb}$ back to the UE, is only transmitted every second frame rather than every frame. The intervening frames each contain a respective portion of the maximum data transmission rate that exists at node B at the start of the 2L frames. The node B procedure in FIG. 9A shows the two paths, one for the $d_k$ values being transmitted in each second frame and the other for the $q_k$ values being transmitted in the other frames. This procedure could be generalized, such that a respective portion of the maximum data transmission rate that exists at node B at the start of 3*L frames is only included in every third frame, with the other two frames of each three frames carrying a respective differential correcting rate.

In node B, residue k % (L*P) is first calculated and compared with zero at box 122 in FIG. 9A. If k % (L*P)=0, then encR is set to encoded $R^{nb}_k$, and encR is divided to into L sub-frames at box 123.

Next, remainder (k % p) is compared with zero at box 124. If (k % p)≠0, then the uplink rate request which is received at $k^{th}$ frame from a UE is decoded at box 125, $R^{nb}_{k+1}$ is determined based on the noise raise and the UE's rate request at box 126, and $d_k$, which is calculated by $R^{nb}_{k+1} - R^{nb}_k$, is sent on the downlink to complete the procedure at box 127. If (k % p)=0 at box 124, then i is set to (k/p) % L at box 128 and $q^k$, which the $i^{th}$ sub-block of encR, is sent on the downlink to complete the procedure at box 129.

In the UE, the remainder (k % p) is compared with zero at box 131. If (k % p)=0, then i is set to (k/p) % L at box 132, $q_k$ is received from downlink at box 133, and i is compared with L−1 at box 134. If i=L−1, then decR is set to decoding(encR$^{nb}$) at box 135, and cR$^{ue}$ is compared with decR at box 136. If cR$^{ue}$=decR, then the procedure is completed, ant otherwise R$^{ue}$ is updated by $R^{ue}_{k+1}$=decR+AccDelta to complete the procedure at box 137.

If i≠L−1 at box 134, then i is compared with zero at box 138. If i≠0 then the procedure is completed, and otherwise AccDelta is reset to zero and cR$^{0ue}$ is updated by $R^{ue}_k$ to complete the procedure at box 139.

If (k % p)≠0 at box 131, then the uplink rate request is determined based on the data status and the transmission power margin at box 140, the uplink rate request is sent at box 141, the downlink rate control $d^{ue}_k$ is decoded at box 142, R$^{ue}$ is updated by $R^{ue}_{k+1} = R^{ue}_k + d^{ue}_k$ at box 143, and AccDelta is updated by AccDelta+$d^{ue}_k$ to complete the procedure at box 144.

The key concept in the third simultaneous signalling scheme is to have node B transmit to the UE frames with only the differential correcting rates, and when either node B or the UE subsequently notices that node B and the UE have fallen out of transmission-rate synchronization, for the noticing party to contact the RNC, and for the RNC to then place node B and the UE back into synchronization by sending a correcting signal to one of them. Whereas node B transmits to the UE using layer 1 signalling, the RNC transmits to node B or the UE using layer 3 signalling. This scheme, which is termed "event-triggered-based signalling" is illustrated in FIG. 11.

Figure 11:
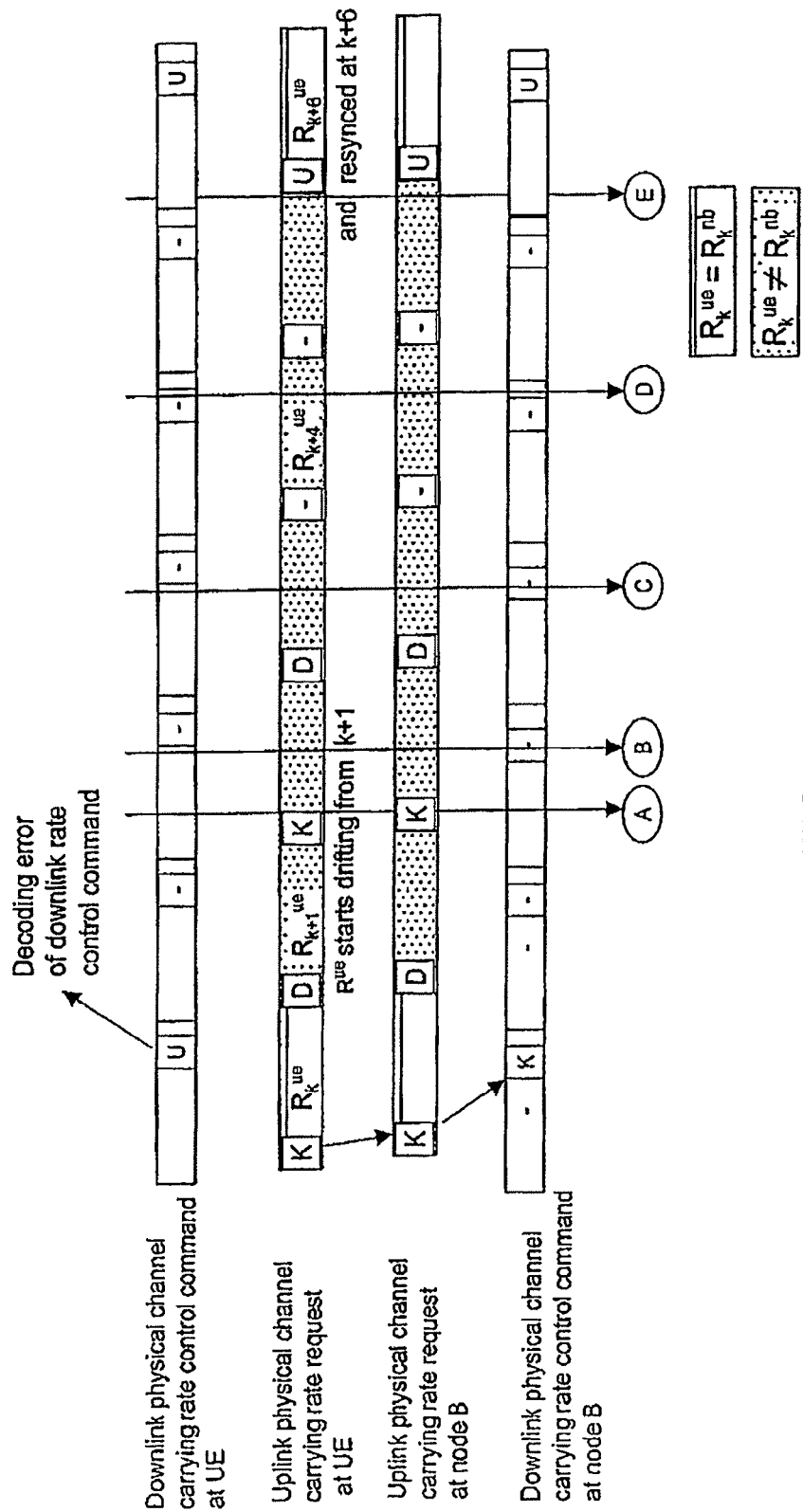
FIG. 11 illustrates the control timing involved with a third type of simultaneous signalling scheme of the subject invention.

With respect to "A" in FIG. 11, after receiving and encoding a data packet from the UE, node B detects that the data transmission rates are out of synchronization. It reports this fact to the RNC and includes information on the current connection frame number (CFN) and its own transmission rate. Node B stops updating $R^{nb}$. To set a maximum waiting time before it receives a response from the RNC, node B starts a $T_{unsync}$ timer which increases by 1 every frame. If $T_{unsync}$ expires, node B deletes the radio link. At "B" in FIG. 11, the RNC sends the UE a layer 3 packet to reset its $R^{ue}$ at a value equal to $R^{nb}$ (which value the RNC knows from node B). The exact timing of the reset is set by the UE. At "C," the UE sends the RNC a layer 3 packet to acknowledge receipt and to inform the RNC of the timing of the reset of $R^{ue}$ to the $R^{nb}$ value. The UE stops sending uplink data requests to node B. At "D," after receiving the UE's acknowledgment, the RNC informs node B of the timing reset, CFN=k+d. Node B stops the timer $T_{unsync}$, and then resets it. At "E," synchronization is achieved between node B and the UE. Closed-loop rate control is thereby resumed.

Some examples of triggering events are: (1) node B detects that the UE is transmitting with a data rate that is higher than the maximum rate; (2) node B detects that that the UE is transmitting with a fixed data rate that is lower than the maximum rate over several consecutive frames of successful reception; and (3) the UE detects that the rate control command received from node B is UP or DOWN when the UE's $R^{ue}$ is at a maximum or minimum, respectively.

A third solution to the problem mentioned above involves a slow-rate adjustment loop, in which exponential filtering is applied to both of the differential control packets $d^{nb}$ and due at node B and the UE, respectively. The concept involves gradually reducing the impact on past feedback error on the current maximum transmission rate $R^{ue}$.

Figure 12:
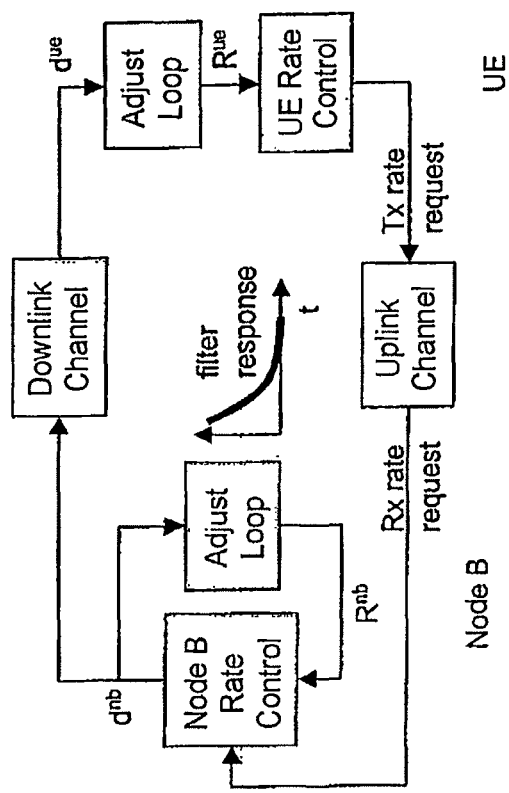
FIG. 12 illustrates a slow-rate adjustment loop scheme of the subject invention, this scheme using exponential filtering at both node B and the UE; and, FIG. 13 illustrates the effect of a soft handover on the above-described schemes of the subject invention.

The third solution is discussed with reference to FIG. 12. As a first step, the RNC signals a reference rate $R^{ref}$ and a convergence coefficient r to both node B and the UE. Subsequently, rate-control iteration is performed by repeating the following four steps:

(1) the UE calculates a rate request based on internal info and on the current $R^{ue}_k$ value;

(2) on receiving the UE request, node B controls the transmission rate based on internal info and on $R^{nb}_k$;

(3) after node B calculates $d^{nb}_k$, node B updates its $R^{nb}_k$ using the formula:

$$R^{nb}_{k+1} = R^{nb}_k + d^{nb}_k + (1-r) \cdot (R^{ref} - R^{nb}_k);$$

(4) after receiving $d^{ue}_k$, the UE updates its $R^{ue}_k$ using the formula:

$$R^{ue}_{k+1} = R^{ue}_k + d^{ue}_k + (1-r) \cdot (R^{ref} - R^{ue}_k);$$

If the adjustment formula is rewritten in a non-recursive way as:

$$R^{ue}_{k+i} = R^{ref} + r^k \cdot (R^{ue}_1 - R^{ref}) + [r^{k-1} \cdot d^{ue}_1 + \ldots + r^1 \cdot d^{ue}_{k-1} + r^0 \cdot d^{ue}_k],$$

where the $R^{ue}_{k+1}$ becomes a function of initial rate $R^{ue}_1$ the reference rate $R^{ref}$ and the sequence of detected rate-control commands $d^{ue}_k$. From this expression, $R^{ue}_{k+1}$ is shown to be dominantly controlled by the most recent rate-control commands due to exponential weighting. For example, [$d^{ue}_1$, $d^{ue}_2$, ..., $d^{ue}_{k-N}$], where $r^{k-N}$<0.1, has only a marginal influence on $R^{ue}_{k+1}$. Therefore, the influence of an error in $d^{ue}_k$ will be gradually reduced as time progresses, so that the slow synchronization of $R^{ue}_k$ toward $R^{nb}_k$ is achieved.

The adjustment loop should always be employed at both node B and the UE simultaneously. Otherwise, $R^{ue}$ and $R^{nb}$ will drift from each other even without feedback error. Note that the adjustment loop does not impose any restriction on the actual rate-control algorithm. In the above equations, $R^{ref}$ is the center of the control range of $R^{ue}$. Even with the adjustment loop, the probability of drifting cannot become zero. Therefore, the UE could occasionally send a data packet at a rate higher than the allowed level. However, even in such case, the impact on uplink noise raising will be small. Also note that no layer 1 overhead bit is required, indicating spectral efficiency. The correction of the adjustment loop should be accumulated if the rate control step size is discrete, i.e. +1/−1.

A fourth generalized solution applying to the problem mentioned above is a scheme involving adjustment of power offset with repetition to reduce signalling error rate. This scheme may be applied independently of the first, second and third solutions discussed above, or may be in conjunction with one of those solutions.

The key concept in the fourth solution is that the RNC sends to both node B and the UE an initial power offset value and repetition value to reduce signalling error rate. Downlink is more critical than uplink, and the unbalanced bit energy setting is spectrally efficient in such a way that the downlink target error rate (DTER) is lower than the uplink target error rate (UTER).

The RNC sends to both node B and the UE a respective initial power offset value and a respective repetition factor at radio link establishment. The respective initial power offset value corresponds to the power offset value that corresponds to the minimum repetition factor, using the following equation for node B:

$$tSIR_{rc}=tSIR_{dp}+PO_{rc}(0)+10*\log_{10}(REP_{rr}(0)),$$

where:
$tSIR_{rc}$ is the target SIR (signal/interference ratio) for a rate request satisfying UTER;
$tSIR_{dp}$ is the target SIR of the dedicated pilot;
$PO_{rc}(0)$ is the initial power offset value to be sent by the RNC to node B; and,
$REP_{rc}(0)$ is the minimum repetition factor that is to be sent by the RNC to node B and the UE;
and using the following equation for the UE:

$$tSIR_{rr}=tSIR_{dp}+PO_{rr}(0)+10*\log_{10}(RBP_{rr}(0)),$$

where:
$tSIR_{rr}$ is the target SIR (signal/interference ratio) for a response command satisfying DTER;
$tSIR_{dp}$ is the target SIR of the dedicated pilot signal for node B and the UE;
$PO_{rr}(0)$ is the initial power offset value to be sent by the RNC to the UE; and,
$REP_{rr}(0)$ is the minimum repetition factor that is to be sent by the RNC to node B and the UE.

The method involved with determining the initial power offset value and the corresponding minimum repetition factor for each of node B and the UE includes the following steps. Firstly, a target Signal/Interference Ratio ($tSIR_r$) is determined, where $tSIR_r$ is a SIR that satisfies a respective target feedback error rate. Next, a $tSIR_d$ is determined, which is a target SIR of a dedicated pilot signal between node B and the UE. Next, using the determined $tSIR_r$ and $tSIR_d$, a relationship between power offset values ($PO_r$) and repetition factors ($REP_r$) is determined, using the following formula:

$$PO_r=tSIR_r-tSIR_d-10*\log_{10}(REP_r).$$

Next, the initial power offset value $PO_r(0)$ is selected as that power offset value that corresponds to a minimum value ($REP_r(0)$) for the repetition factor ($REP_r$). Then, at radio link establishment, the selected initial power offset value $PO_r(o)$ and the corresponding minimum repetition factor $REP_r(0)$ for the base station are transmitted to the base station, and the respective values for the mobile phone are transmitted to the mobile phone. The radio network controller (RNC) performs all the steps in this procedure.

With respect to the capacity of an existing network, a high repetition factor and low power offset can ensure capacity of the existing network but it results in a slow adaptation to a change in requirements. DTER for a DOWN/UP command can be distinctively set $tSIR_{rc}(DOWN) > tSIR_{rc}(UP)$, which can steer the direction of random walk.

A further feature of the subject invention involves the handling of soft handovers. This will be discussed with respect to FIG. 13.

Assume that the UE is communicating with two node B's in a soft handover situation. The process begins with the step of each active node B sending differential signals for Up/Down/Keep independently, i.e. there are two differential signals $d^{ue1}$ and $d^{ue2}$. Upon receiving downlink differential signals, the UE updates its allowed rate for each node B, i.e. (1) $R^{ue1}_{k+1}=R^{ue1}_k+d^{ue1}$, and (2) $R^{ue2}_{k+1}=R^{ue2}_k+d^{ue2}$. The UE controls the rate based on the allowed rate for each cell (each of which has a node B), resulting in $R^{ue}_{k+1}=\text{func}(R^{ue1}_{k+1}, R^{ue2}_{k+1})$. If the UE wishes to increase/decrease $R^{ue}$, it sends $q^{ue}_{k+1}$ to both node B's. The two node B's receive the rate request and select a new rate $R^{nb1}_{k+1}=R^{nb1}_k+d^{nb1}_k$. The process proceeds with a continuing repetition of the foregoing steps.

Figure 13:
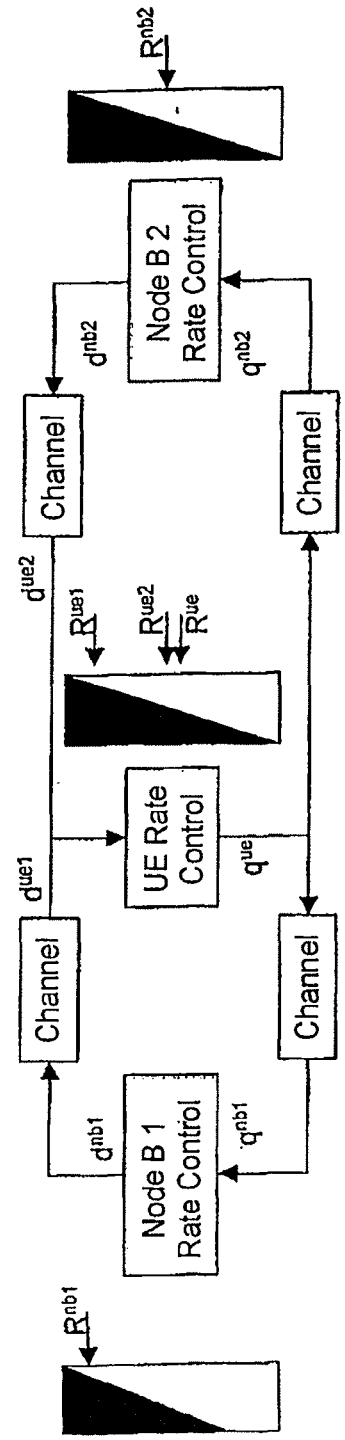

Note that the UE has to maintain three maximum rates, i.e. $R^{ue}$, $R^{ue1}$ and $R^{ue2}$. Drifting is possible between $R^{nb1}$ and $R^{ue1}$, and also between $R^{nb2}$ and $R^{ue2}$. Simultaneous signalling (as discussed previously) can be applied to each maximum rate so that each active node B transmits both explicit and differential signalling independently of the other. The UE then performs the synchronization procedure for each cell. In the case of the adjustment loop (as discussed previously), a separate adjustment loop is employed for each cell. In FIG. 13, the two node B's are designated as node B1 and node B2, and the UE Rate Control produces a rate based on the respective sensed inputs $d^{ue1}$ and $d^{ue2}$.

While the present invention has been described in its preferred embodiments, it is to be understood that the words which have been used are words of description rather than limitation, and that changes may be made to the invention without departing from its scope as defined by the appended claims.

Each feature disclosed in this specification (which term includes the claims) and/or shown in the drawings may be incorporated in the invention independently of other disclosed and/or illustrated features.

Next, an example of inner configuration of each of node B (i.e., a base station) and the UE (i.e., a mobile phone) will be described.

Figure 14:
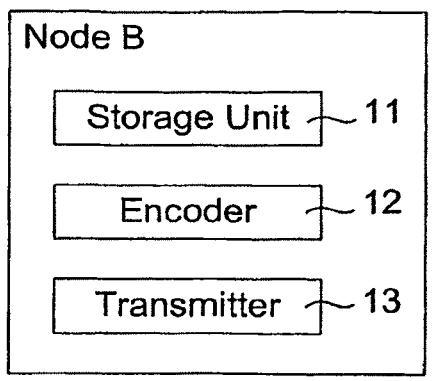
FIG. 14 illustrates an example of an inner configuration of node B.

Node B illustrated in FIG. 14 is arranged to maintain closed-loop control of a data communication rate between node B and the UE. Node B includes: storage unit 11 for storing, at the start of transmission of a defined set of data packets, an initial data transmission rate; encoder 12 for encoding, at the start of transmission of the defined set, the initial data transmission rate; and transmitter 13 for transmitting, in each data packet of the defined set, a respective differential correcting rate and a respective segment of the encoded initial data transmission rate.

Figure 15:
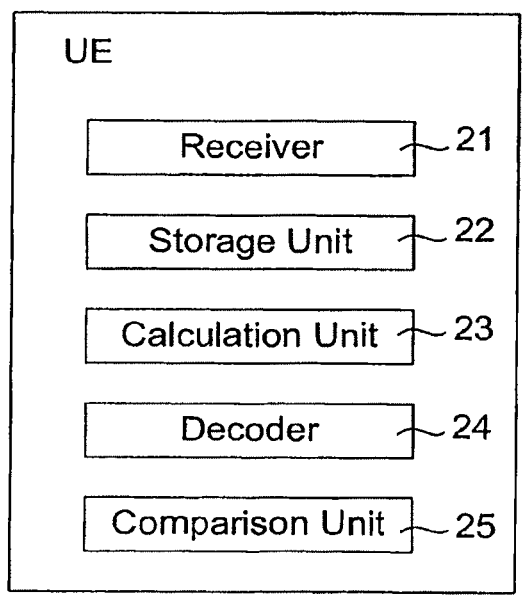
FIG. 15 illustrates an example of an inner configuration of the UE.

The UE illustrated in FIG. 15 is used in combination with node B illustrated in FIG. 14. The UE includes: receiver 21 for receiving, in each data packet of a defined set, a respective differential correcting rate and a respective segment of an encoded initial data transmission rate; storage unit 22 for storing, as each data packet is received, the respective differential correcting rate and the respective segment of the encoded initial data transmission rates; calculation unit 23 for calculating, for each data packet of the defined set, an updated data transmission rate, the updated rate for a particular data packet of the defined set being the differential correcting rate received in the particular data packet added to the updated rate from the previous data packet, the initial data transmission rate being used as the initial one of the updated rates; decoder 24 for decoding, after all of the segments in the defined set of data packets have been received, those segments to form a decoded initial data transmission rate; and comparison unit 25. Comparison unit 25 is provided for comparing the decoded initial data transmission rate with the updated transmission rate, and, if the transmission rates are not equal in the comparison, correcting the data transmission rate by replacing the updated transmission rate by a transmission rate obtained by adding to the decoded initial data transmission rate an aggregate differential correcting rate equal to an aggregate of the differential correcting rates of the defined set of data packets, and if the transmission rates are equal, using the updated transmission rate.

In another example, transmitter 13 transmits, in every $n^{th}$ data packet of the defined set, a respective segment of the encoded initial data transmission rate, and in the remaining data packets of the defined set a respective differential correcting rate; receiver 21 receives, in every $n^{th}$ data packet of a defined set, a respective segment of an encoded initial data transmission rate, and in the remaining data packets of the defined set a respective differential correcting rate; and decoder 24 decodes, after all segments of the encoded initial data transmission rate in the defined set of data packets have been received, those segments to form a decoded initial data transmission rate. In this example, every $n^{th}$ data packet of the defined set may be every second data packet or every third data packet of the defined set. Each segment of the encoded initial data transmission rate may be a single data bit.

Figure 16:
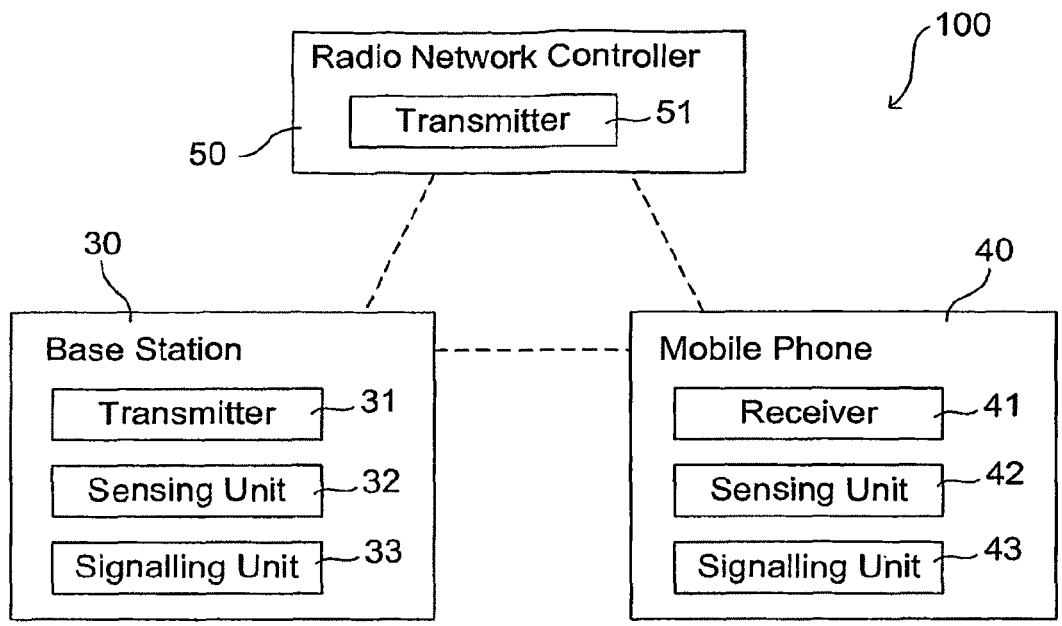
FIG. 16 illustrates an example of a communication system according to the subject invention.

FIG. 16 illustrates an example of a communication system according to the present invention. System 100 includes base station 30, mobile phone 40 and radio network controller (RNC) 50. In this system, closed-loop control of a data communication rate between base station 30 and mobile phone 40 is maintained.

Base station 30 includes: transmitter 31 for transmitting to mobile phone 40, in each one or only some of a defined set of data packets, a differential correcting rate, each differential correcting rate representing a data-transmission-rate differential, if any, between the data transmission rate of the particular data packet and the date transmission rate of the transmitted data packet that last contained a differential correcting rate; sensing unit 32 for sensing when a difference occurs between the data transmission rate of base station 30 and the data transmission rate of mobile phone 40, and after such sensing, forwarding a request to radio network controller 50 that the data transmission rate of base station 30 and the data transmission rate of mobile phone 40 be reset to a common data transmission rate; and signalling unit 33 for receiving explicit signalling from radio network controller 50 for resetting the data transmission rate of base station 30 to a rate corresponding to the transmission rate of the mobile phone 40.

Mobile phone 40 includes: receiver 41 for receiving from base station 30, in each one or only some of a defined set of data packets, a differential correcting rate, each differential correcting rate representing a data-transmission-rate differential, if any, between the data transmission rate of the particular data packet and the date transmission rate of the transmitted data packet that last contained a differential correcting rate; sensing unit 42 for sensing when a difference occurs between the data transmission rate of base station 30 and the data transmission rate of mobile phone 40, and after such sensing, forwarding a request to radio network controller 50 that the data transmission rate of base station 30 and the data transmission rate of mobile phone 40 be reset to a common data transmission rate; and signalling unit 43 for receiving explicit signalling from radio network controller 50 for resetting the data transmission rate of mobile phone 40 to a rate corresponding to the transmission rate of base station 40.

Radio network controller 50 includes transmitter 51 for transmitting to base station 30 and/or mobile phone 40, explicit signalling for resetting the data transmission rate of base station 30 and/or the data transmission rate of mobile phone 40 such that base station 30 and mobile phone 40 again have a common data transmission rate.

In this example, one of sensing units 32 and 42 may be eliminated and one of signalling units 33 and 43 may be eliminated.

Figure 17:
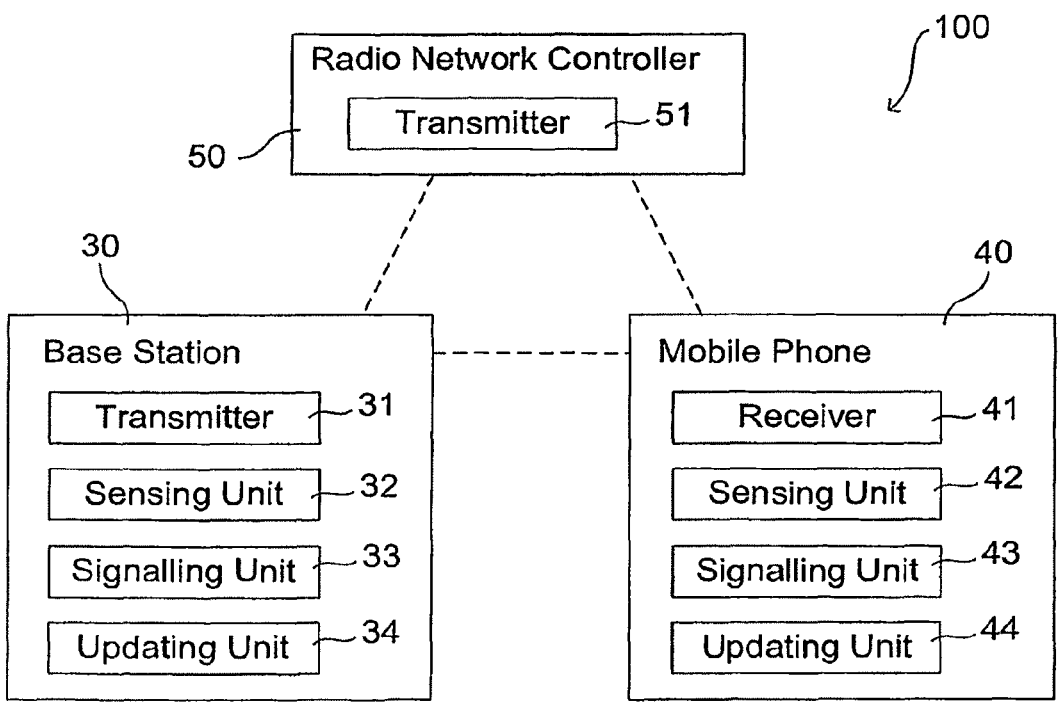
FIG. 17 illustrates another example of a communication system according to the subject invention.

Alternatively, as shown in FIG. 17, base station 30 and mobile phone 40 further includes updating units 34 and 44, respectively. Updating unit 34 updates a data transmission rate of base station 30 each time a rate request signal is received, the updating being according to the following updating expression:

$$R^{nb}(i+1)=R^{nb}(i)+d^{nb}(i)+(1-r)(R_{ref}-R^{nb}(i))$$

where:

"i+1" is a current period;

"i" is a preceding period;

"$R^{nb}$" is the data transmission rate in a particular period updated by the base station;

"$d^{nb}$" is a differential correcting rate decided upon in each period using a rate request signal received from the mobile phone;

"$R_{ref}$" is a reference rate for data transmission, the reference rate being a value received initially; and, "r" is a convergence coefficient for data transmission, the coefficient being a value received initially.

Similarly, updating unit 44 updates a data transmission rate of mobile phone 40 each time a rate command signal is received, each updating being according to the following updating expression:

$$R^{ue}(i+1)=R^{ue}(i)+d^{ue}(i)+(1-r)(R_{ref}-R^{ue}(i))$$

where:

"$R^{ue}$" is the data transmission rate in a particular period updated by the mobile phone;

"$d^{ue}$" is a differential correcting rate detected by the mobile phone.

In this example, the reference rate $R_{ref}$ and the convergence coefficient r are received at base station 30 and mobile phone 40 initially from radio network controller 50 of the system.

Figure 18:
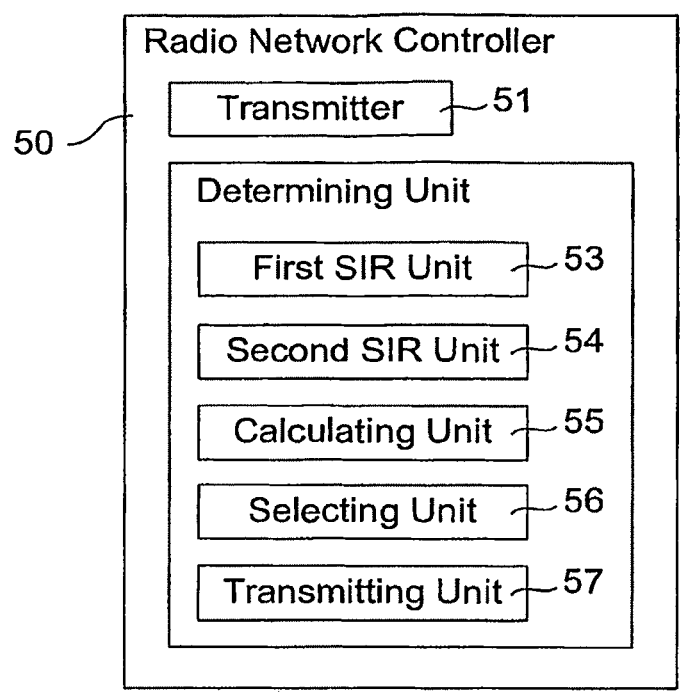
FIG. 18 illustrates another example of a radio network controller according to the subject invention.

As shown in FIG. 18, radio network controller 50 may further includes determining unit 52 for determining, for each of base station 30 and mobile phone 40, a respective initial power offset value and a respective minimum repetition factor at establishment of a radio link between base station 30 and mobile phone 40. The determining unit 52 may includes first SIR unit 53 for determining a target Signal/Interference Ratio (tSIR$_r$), where tSIR$_r$ is a SIR (Signal/Interference Ratio) for a date transmission rate that satisfies a respective target feedback error rate; second SIR unit 54 for determining a tSIR$_d$, which is the target SIR of a dedicated pilot signal; calculating unit 55 for determining, using the determined tSIR$_r$ and tSIR$_d$, a relationship between power offset values (PO$_r$) and repetition factors (REP$_r$), using the following formula:

$$PO_r = tSIR_r - tSIR_d - 10*\log_{10}(REP_r);$$

selecting unit 56 for selecting the initial power offset value PO$_r$(0) as that power offset value that corresponds to a minimum value (REP$_r$(0)) for the repetition factor (REP$_r$); and, transmitting unit 57 for transmitting, to the base station and the mobile phone at radio link establishment, the respective selected initial power offset value PO$_r$(0) and the respective corresponding minimum repetition factor REP$_r$(0).

The text of the abstract filed herewith is repeated here as part of the specification.

Base station control the transmission rate that is used by mobile phones to forward them information. A mobile phone periodically forwards a rate request to a base station if the mobile phone needs to have its data transmission rate to the base station increased or decreased, and the base station responds with a rate command. An error can occur in the transmission of the rate command, such that a rate $R^{nb}$ transmitted by the base station and detected by the mobile phone as $R^{ue}$ may not match. Various schemes are proposed for reducing and correcting such transmission errors. A first scheme involves periodically resetting the transmission rate of the base station and mobile phone with a reference rate. Second to fourth schemes involve periodically comparing the transmission rates of the base station and mobile phone, and replacing the rate of the mobile phone if they differ. A fifth scheme involves a filtering of the feedback command in order to reduce the impact of error propagation. A sixth scheme, which may be used separately or in conjunction with any of the foregoing schemes, involves adjusting a power offset with a repetition factor. All of the schemes are modified during a soft handover of the mobile phone from the base station to a new base station.

The invention claimed is:

1. User equipment in a communication system comprising a base station, the user equipment comprising:
   a receiver configured to receive, from the base station, a rate control command to up, down or keep a maximum transmission rate of the user equipment, and absolute information by which the maximum transmission rate of the user equipment is determined; and
   a unit configured to determine the maximum transmission rate by using the rate control command if the receiver does not receive the absolute information for a certain frame,
   wherein an initial maximum transmission rate is set in the user equipment prior to receiving the rate control command or absolute information.

2. The user equipment according to claim 1, wherein the unit is configured to determine the maximum transmission rate by using the absolute information if the receiver receives the absolute information for the certain frame.

3. The user equipment according to claim 1, wherein the receiver receives the rate control command at a first predetermined interval.

4. A base station in a communication system comprising user equipment, the base station comprising:
   a transmitter is configured to transmit, to the user equipment, a rate control command to up, down or keep a maximum transmission rate of the user equipment, and absolute information by which the maximum transmission rate of the user equipment is determined,
   wherein an initial maximum transmission rate is set in the user equipment prior to receiving the rate control command or absolute information, and
   wherein the maximum transmission rate is determined by using the rate control command if the user equipment does not receive the absolute information for a certain frame.

5. The base station according to claim 4, wherein the maximum transmission rate is determined by using the absolute information if the user equipment receives the absolute information for the certain frame.

6. The base station according to claim 4, wherein the transmitter transmits the rate control command at a first predetermined interval.

7. A communication system comprising:
   user equipment; and
   a base station,
   wherein the user equipment comprises:
   a receiver configured to receive, from the base station, a rate control command to up, down, or keep a maximum transmission rate of the user equipment, and absolute information by which the maximum transmission rate of the user equipment is determined, and
   the base station comprises:
   a transmitter configured to transmit the rate control command and the absolute information to the user equipment,
   wherein an initial maximum transmission rate is set in the user equipment prior to receiving the rate control command or absolute information, and
   wherein the maximum transmission rate is determined by using the rate control command if the user equipment does not receive the absolute information for a certain frame.

8. The communication system according to claim 7, wherein the maximum transmission rate is determined by using the absolute information if the user equipment receives the absolute information for the certain frame.

9. The communication system according to claim 7, wherein the receiver receives the rate control command at a first predetermined interval.

10. A method for a communication system comprising a base station and user equipment, the method comprising:
    receiving, at the user equipment, a rate control command to up, down, or keep a maximum transmission rate of the user equipment from the base station; and
    receiving, at the user equipment, absolute information by which the maximum transmission rate of the user equipment is determined, from the base station,
    wherein an initial maximum transmission rate is set in the user equipment prior to receiving the rate control command or absolute information,
    wherein the user equipment determines the maximum transmission rate by using the rate control command if the user equipment does not receive the absolute information for a certain frame.

11. The method according to claim 10, further comprising: transmitting, at the base station, the rate control command to the user equipment; and transmitting, at the base station, the absolute information to the user equipment.

12. The method according to claim 10, wherein the user equipment receives the rate control command at a first predetermined interval.

13. User equipment in a communication system comprising a base station, the user equipment comprising:
- first means for receiving, from the base station, a rate control command to up, down, or keep a maximum transmission rate of the user equipment;
- second means for receiving, from the base station, absolute information by which the maximum transmission rate of the user equipment is determined; and
- third means for determining the maximum transmission rate by using the rate control command if the receiver does not receive the absolute information for a certain frame,
- wherein an initial maximum transmission rate is set in the user equipment prior to receiving the rate control command or absolute information.

14. A base station in a communication system comprising user equipment, the base station comprising:
- first means for transmitting, to the user equipment, a rate control command to up, down down, or keep a maximum transmission rate of the user equipment; and
- second means for transmitting, to the user equipment, absolute information by which the maximum transmission rate of the user equipment is determined,
- wherein an initial maximum transmission rate is set in the user equipment prior to receiving the rate control command or absolute information, and
- wherein the maximum transmission rate is determined by using the rate control command if the user equipment does not receive the absolute information for a certain frame.

15. A communication system comprising:

user equipment; and a base station, wherein the user equipment comprising first means for receiving, from the base station, a rate control command to up, down, or keep a maximum transmission rate of the user equipment, second means for receiving, from the base station, absolute information by which the maximum transmission rate of the user equipment is determined, and third means for determining the maximum transmission rate by using the rate control command if the receiver does not receive the absolute information for a certain frame, and the base station comprising fourth means for transmitting the rate control command to the user equipment and fifth means for transmitting the absolute information to the user equipment, wherein an initial maximum transmission rate is set in the user equipment prior to receiving the rate control command or absolute information.

* * * * *